(12) United States Patent
Tsunemachi et al.

(10) Patent No.: US 12,463,711 B2
(45) Date of Patent: Nov. 4, 2025

(54) COMMUNICATION CONTROL APPARATUS, COMMUNICATION CONTROL METHOD, COMMUNICATION CONTROL PROGRAM, COMMUNICATION CONTROL SYSTEM, COMMUNICATION RELAY SATELLITE, AND SATELLITE SYSTEM

(71) Applicant: WARPSPACE, Inc., Ibaraki (JP)

(72) Inventors: Satoru Tsunemachi, Ibaraki (JP); Akihiro Nagata, Ibaraki (JP); Hiromitsu Azuma, Ibaraki (JP)

(73) Assignee: WARPSPACE, INC., Ibaraki (JP)

( * ) Notice: Subject to any disclaimer, the term of this patent is extended or adjusted under 35 U.S.C. 154(b) by 260 days.

(21) Appl. No.: 18/036,669

(22) PCT Filed: Nov. 12, 2021

(86) PCT No.: PCT/JP2021/041809
§ 371 (c)(1),
(2) Date: May 12, 2023

(87) PCT Pub. No.: WO2022/102760
PCT Pub. Date: May 19, 2022

(65) Prior Publication Data
US 2023/0421244 A1    Dec. 28, 2023

(30) Foreign Application Priority Data

Nov. 13, 2020   (JP) ................ 2020-189818
Jul. 21, 2021   (JP) ................ 2021-121038

(51) Int. Cl.
*B04B 7/18*    (2006.01)
*H04B 7/185*   (2006.01)
*H04B 10/118*  (2013.01)

(52) U.S. Cl.
CPC ....... *H04B 7/18513* (2013.01); *H04B 10/118* (2013.01)

(58) Field of Classification Search
CPC ................ H04B 7/18513; H04B 10/118
See application file for complete search history.

(56) References Cited

U.S. PATENT DOCUMENTS

2002/0058477 A1    5/2002   de La Chapelle
2002/0058478 A1    5/2002   de La Chapelle et al.
2003/0207684 A1*  11/2003   Wesel ............... H04B 7/18578
                                                           455/12.1

(Continued)

FOREIGN PATENT DOCUMENTS

JP    H01-276934 A    11/1989
JP    102-084827 A    3/1990

(Continued)

OTHER PUBLICATIONS

International Search Report and Written Opinion mailed on Feb. 8, 2022, received for PCT Application PCT/JP2021/041809, filed on Nov. 12, 2021, 7 pages.

(Continued)

*Primary Examiner* — Brenda H Pham
(74) *Attorney, Agent, or Firm* — XSENSUS LLP

(57) ABSTRACT

A communication control apparatus controls optical communication between a communication relay satellite and plural user satellites such that, when the communication relay satellite relays communication between the plural user satellites and other equipment, a sum of data rates/representing communication rates per unit time between the plural user satellites and the communication relay satellite is not greater than a limit value of a data rate between the communication relay satellite and the other equipment.

17 Claims, 16 Drawing Sheets

(56) References Cited

U.S. PATENT DOCUMENTS

| | | | |
|---|---|---|---|
| 2006/0040614 A1 | 2/2006 | Chapelle et al. |
| 2007/0026795 A1 | 2/2007 | de La Chapelle |
| 2013/0156432 A1 | 6/2013 | Arnold et al. |
| 2014/0016932 A1 | 1/2014 | Coleman et al. |
| 2014/0016941 A1 | 1/2014 | Coleman et al. |
| 2015/0071645 A1 | 3/2015 | Coleman et al. |
| 2020/0014460 A1 | 1/2020 | Tong et al. |

FOREIGN PATENT DOCUMENTS

| | | |
|---|---|---|
| JP | H09-247071 A | 9/1997 |
| JP | 2004-510392 A | 4/2004 |
| JP | 2007-013513 A | 1/2007 |
| JP | 2012-507211 A | 3/2012 |
| JP | 2013-132045 A | 7/2013 |
| JP | 2014-204177 A | 10/2014 |
| JP | 2015-524629 A | 8/2015 |

OTHER PUBLICATIONS

Notice of Reasons for Refusal mailed on Aug. 17, 2021, received for JP Application 2021-121038, 6 pages including English Translation.
Notice of Reasons for Refusal mailed on Oct. 12, 2021, received for JP Application 2021-121038, 5 pages Including English Translation.
Notice of Reasons for Refusal mailed on Mar. 1, 2022, received for JP Application 2021-190596, 5 pages including English Translation.
English machine translation of Office Action issued on Aug. 5, 2025, in corresponding Japanese patent Application No. 2022-076182, 4 pages.

* cited by examiner

[Fig. 1]
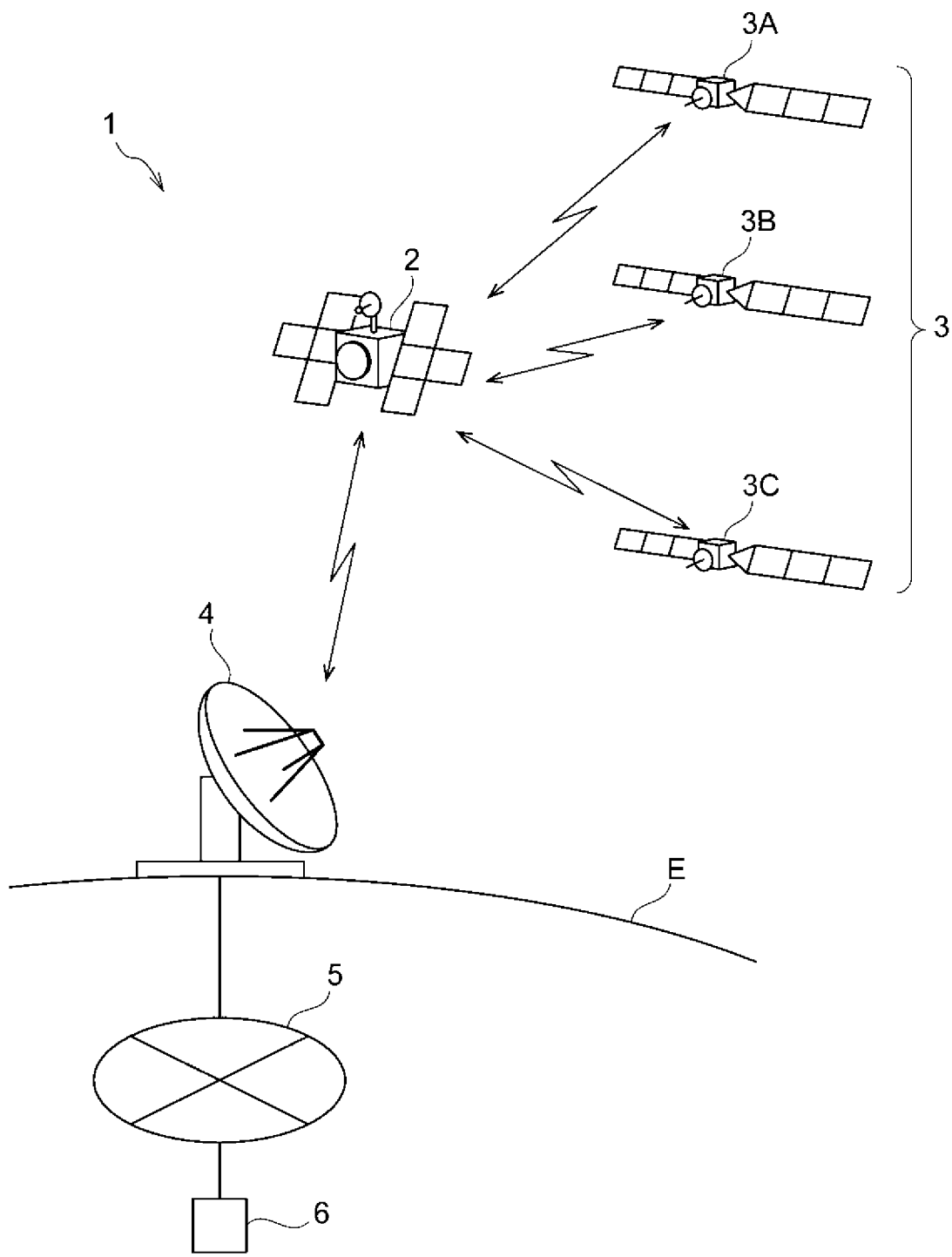

[Fig. 2]
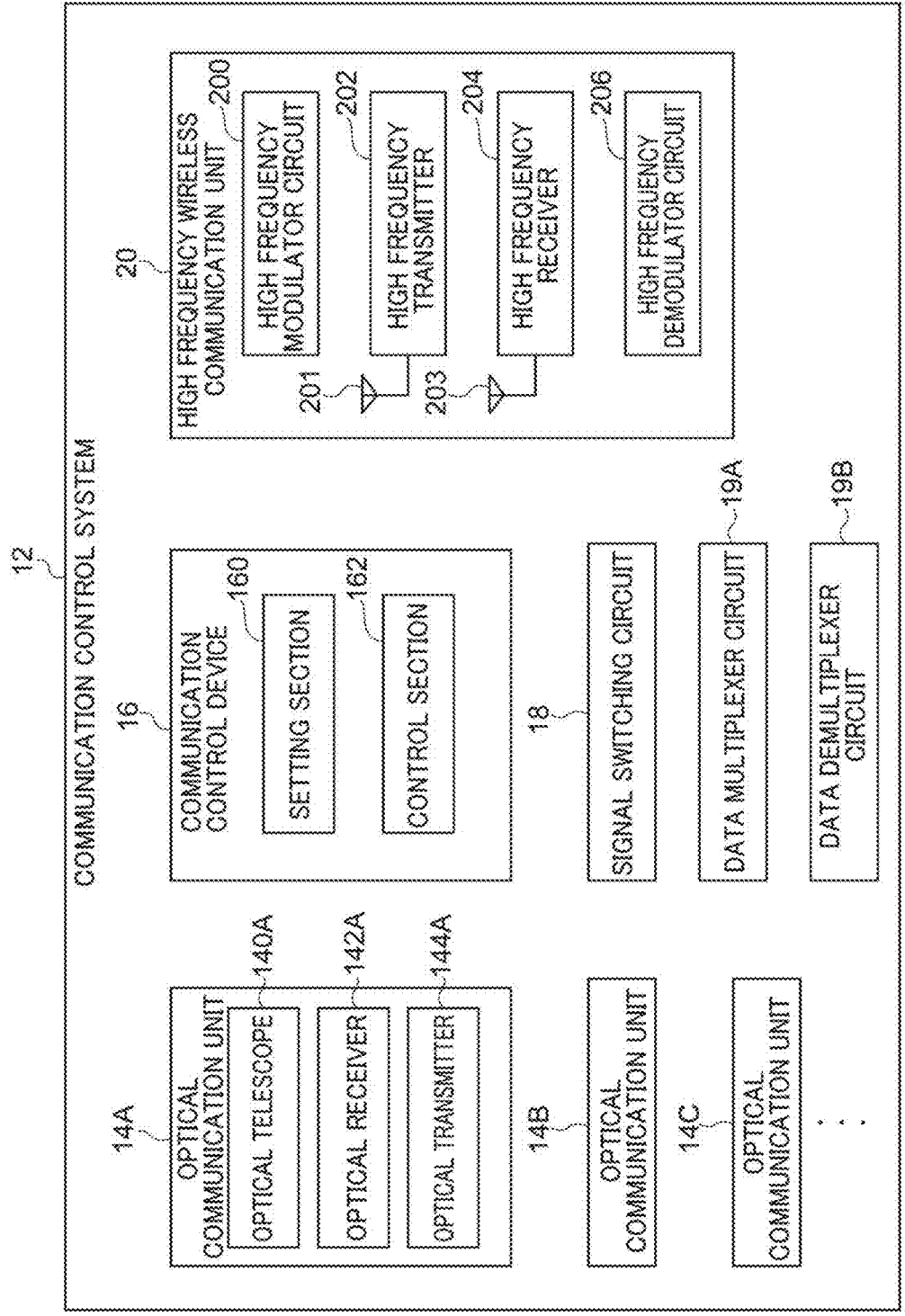

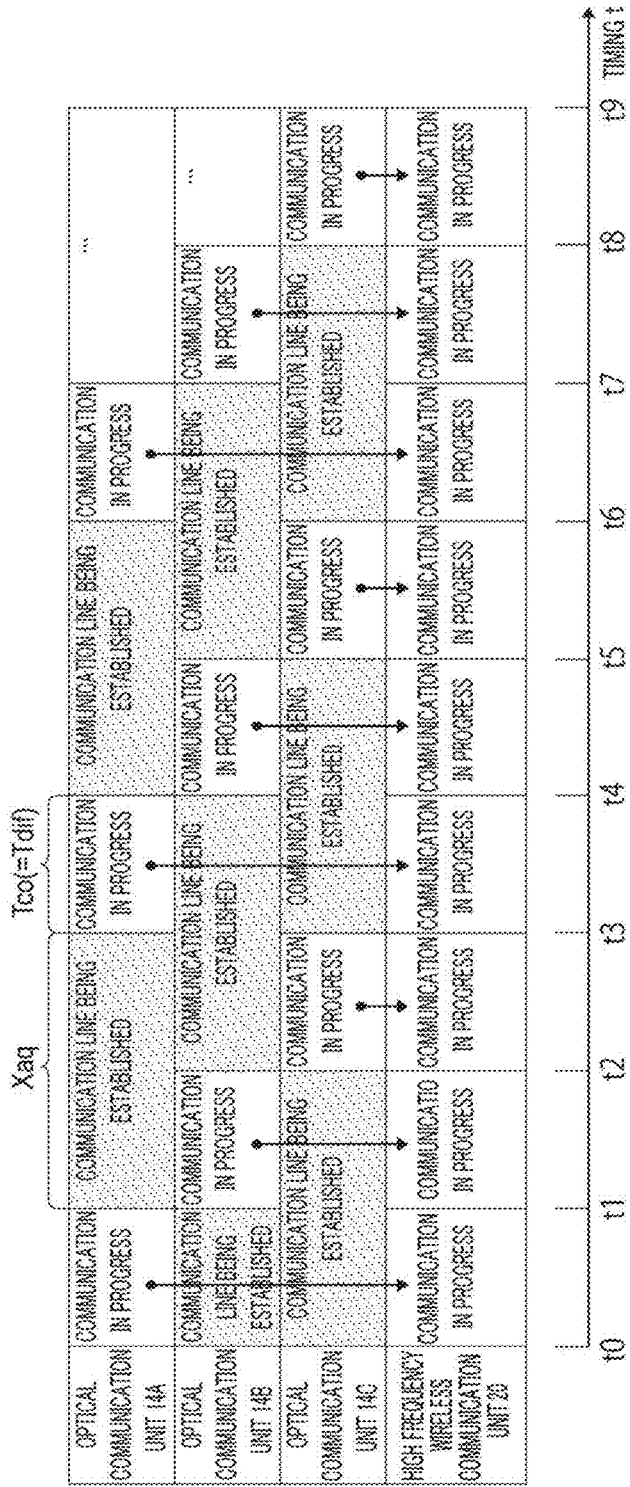

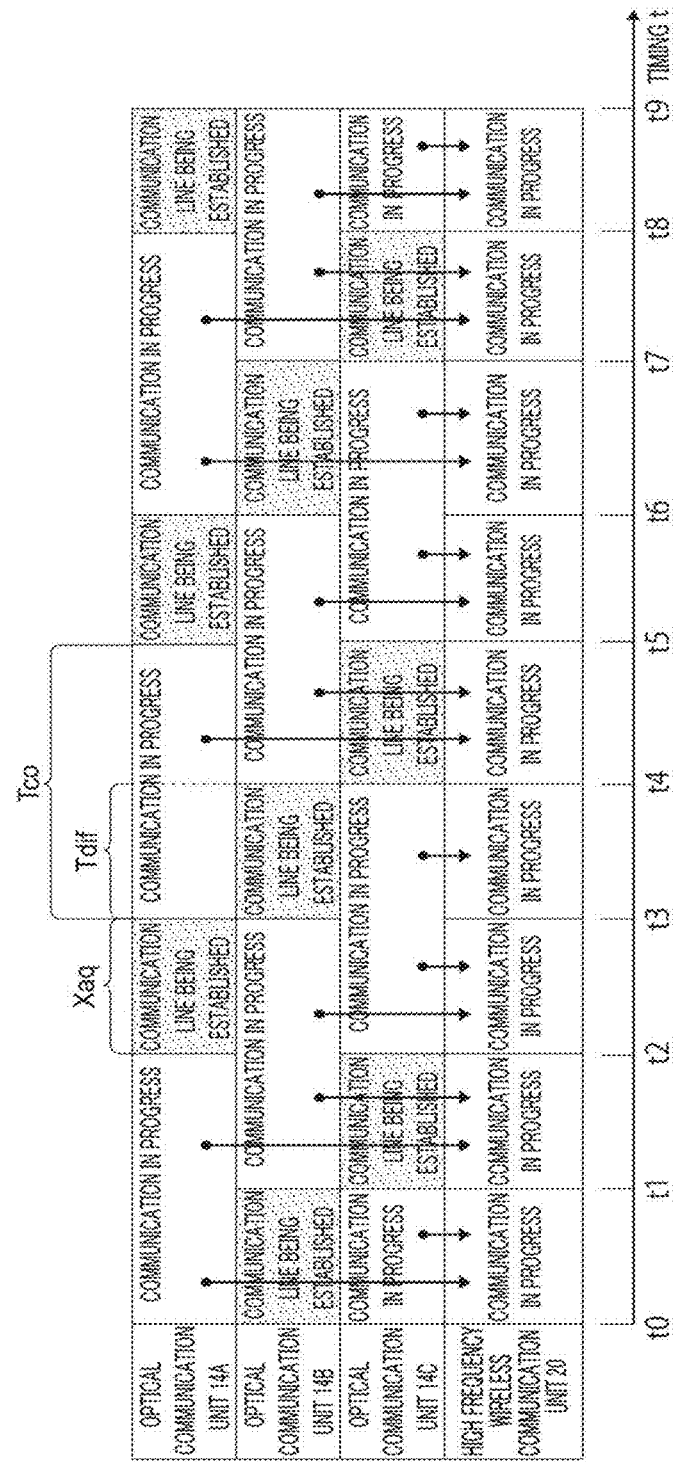
[Fig. 4]

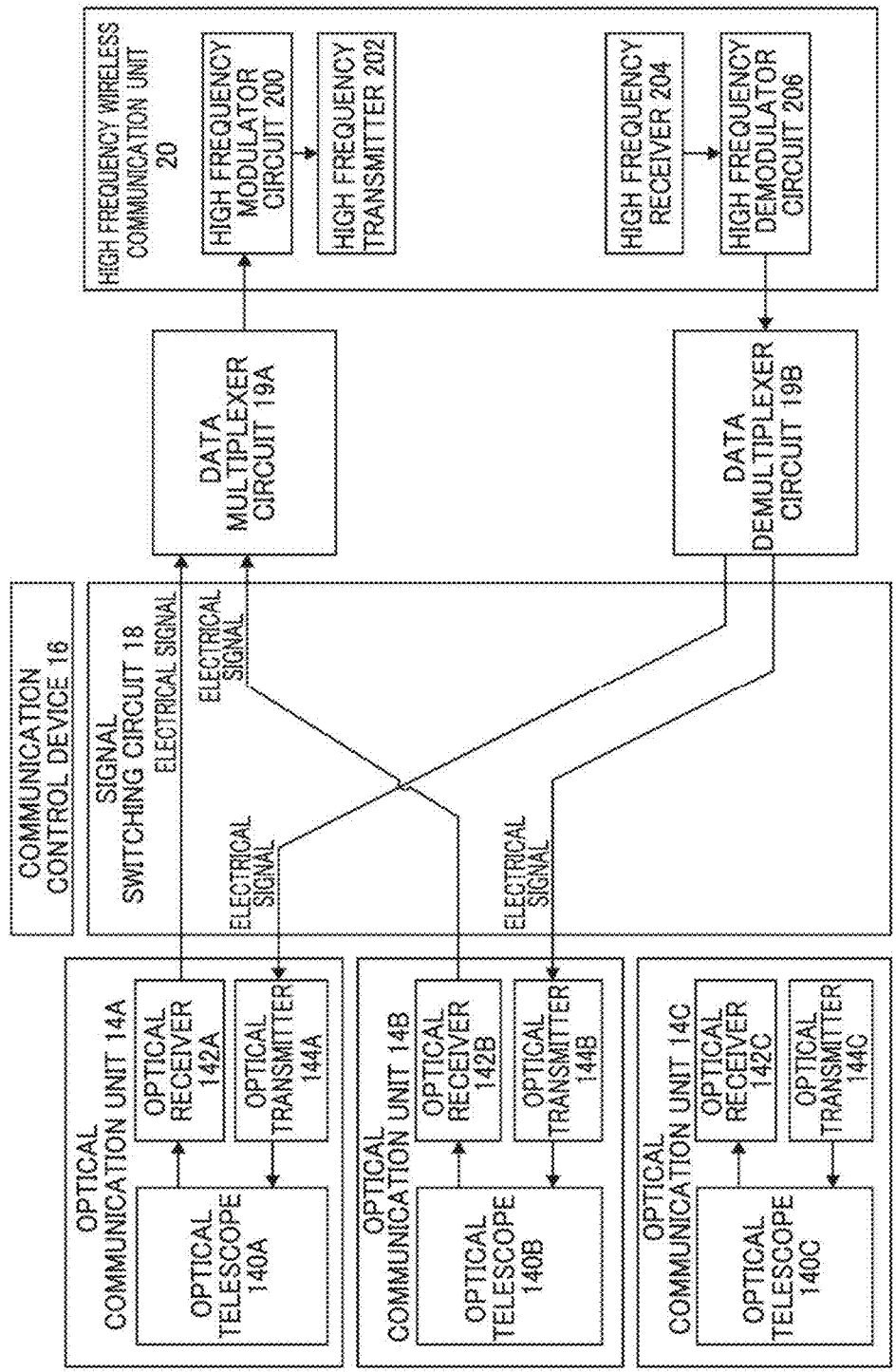
[Fig. 5]

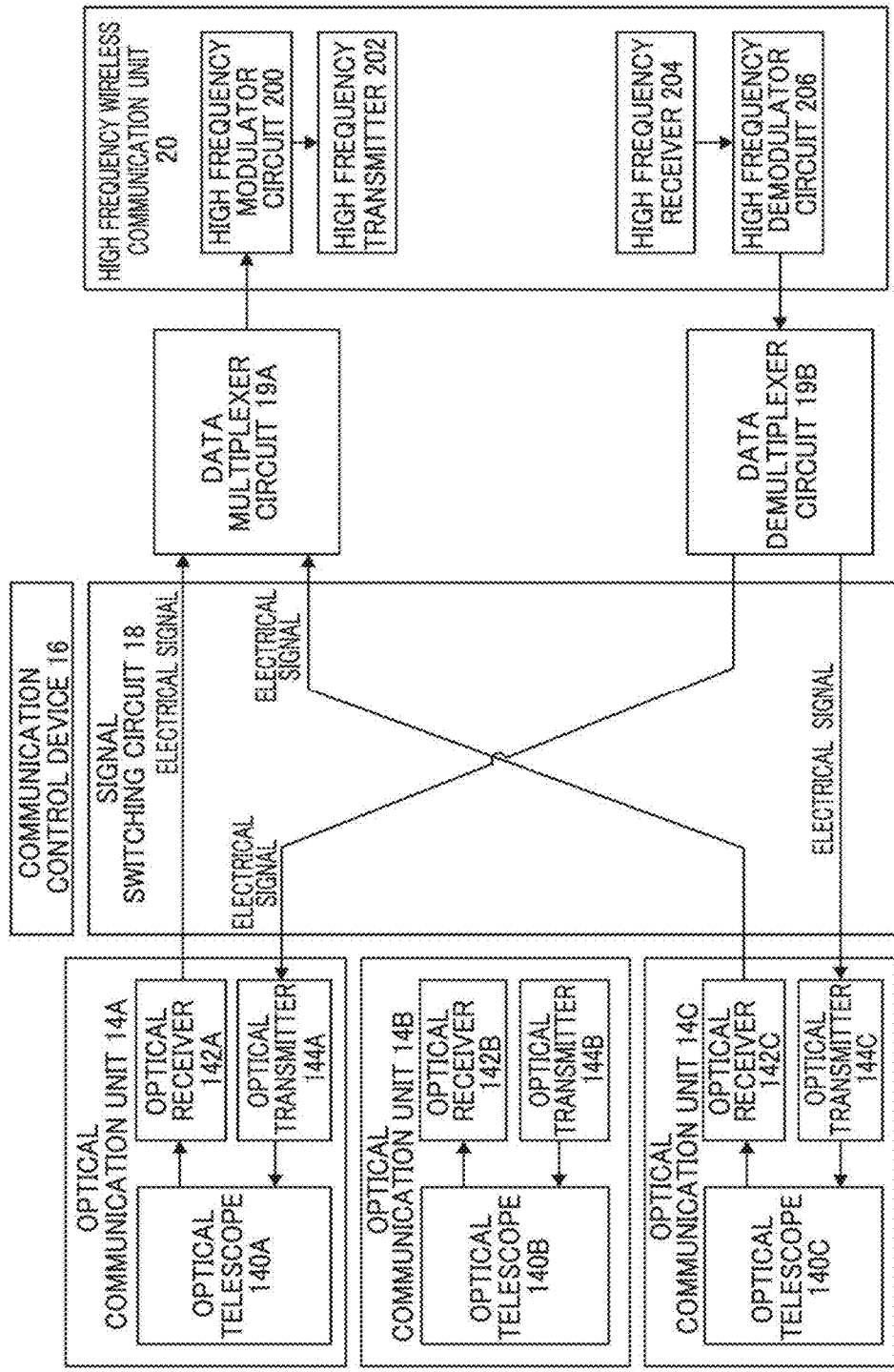
[Fig. 6]

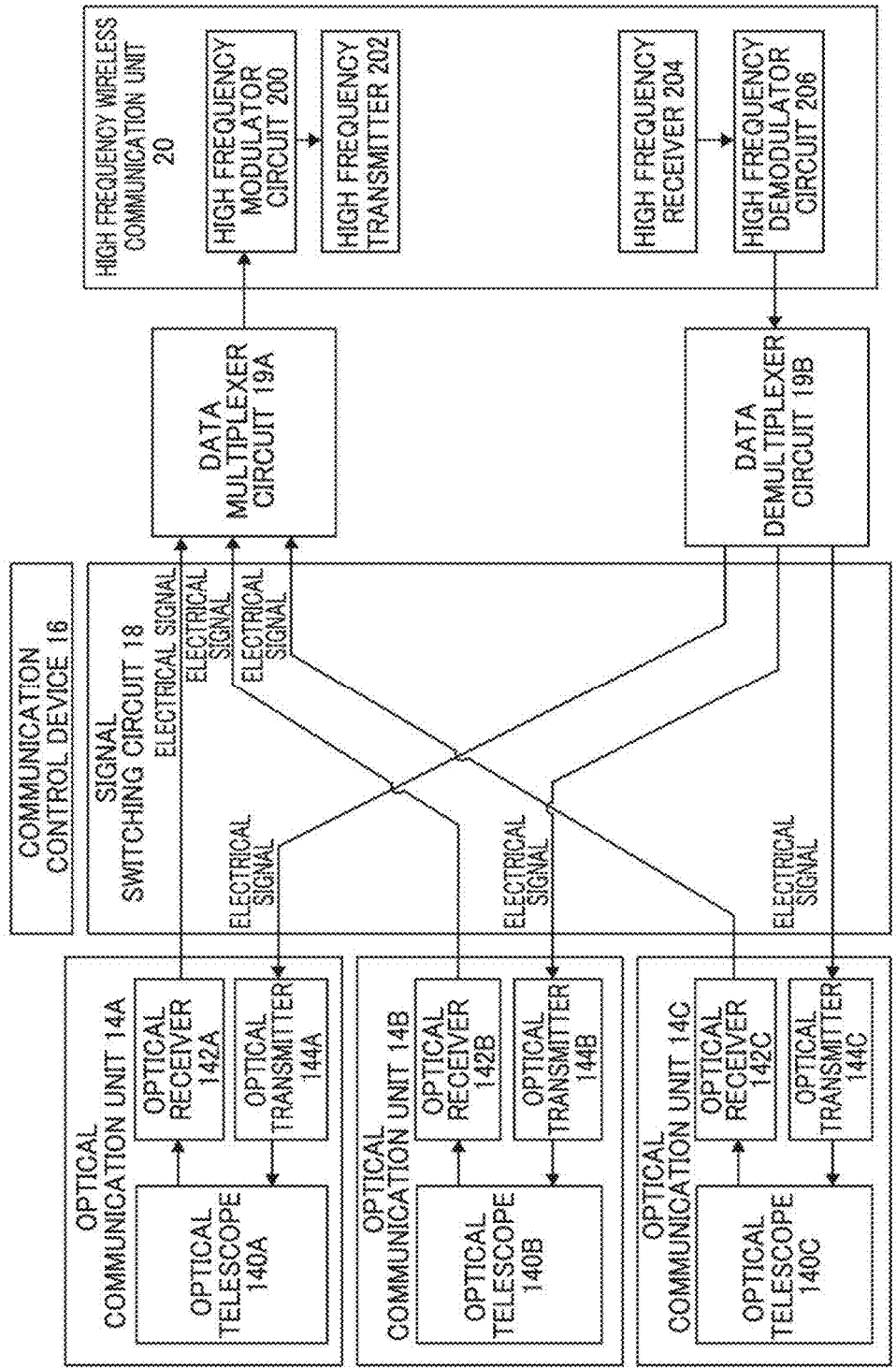
[Fig. 7]

[Fig. 8A]
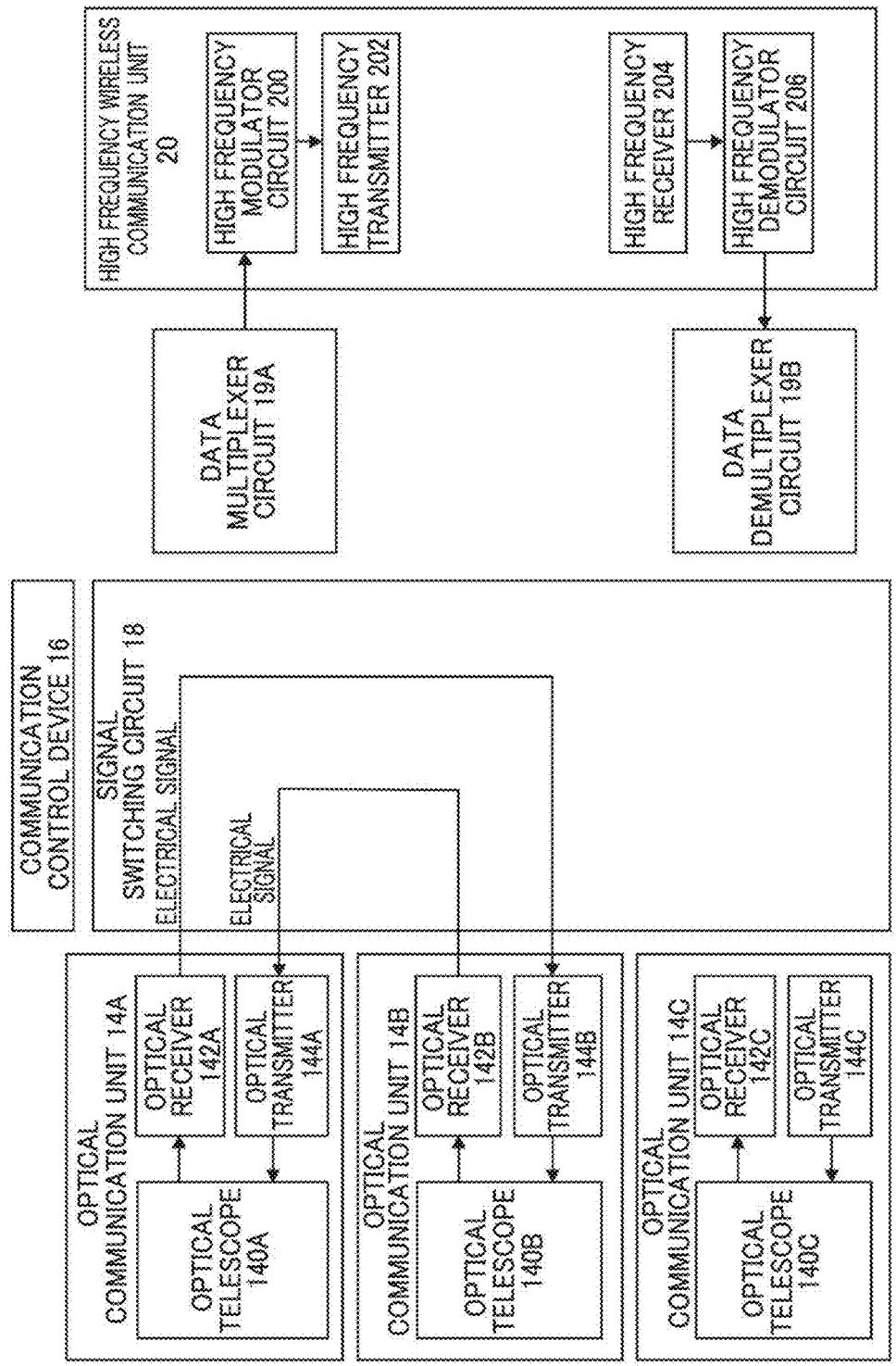

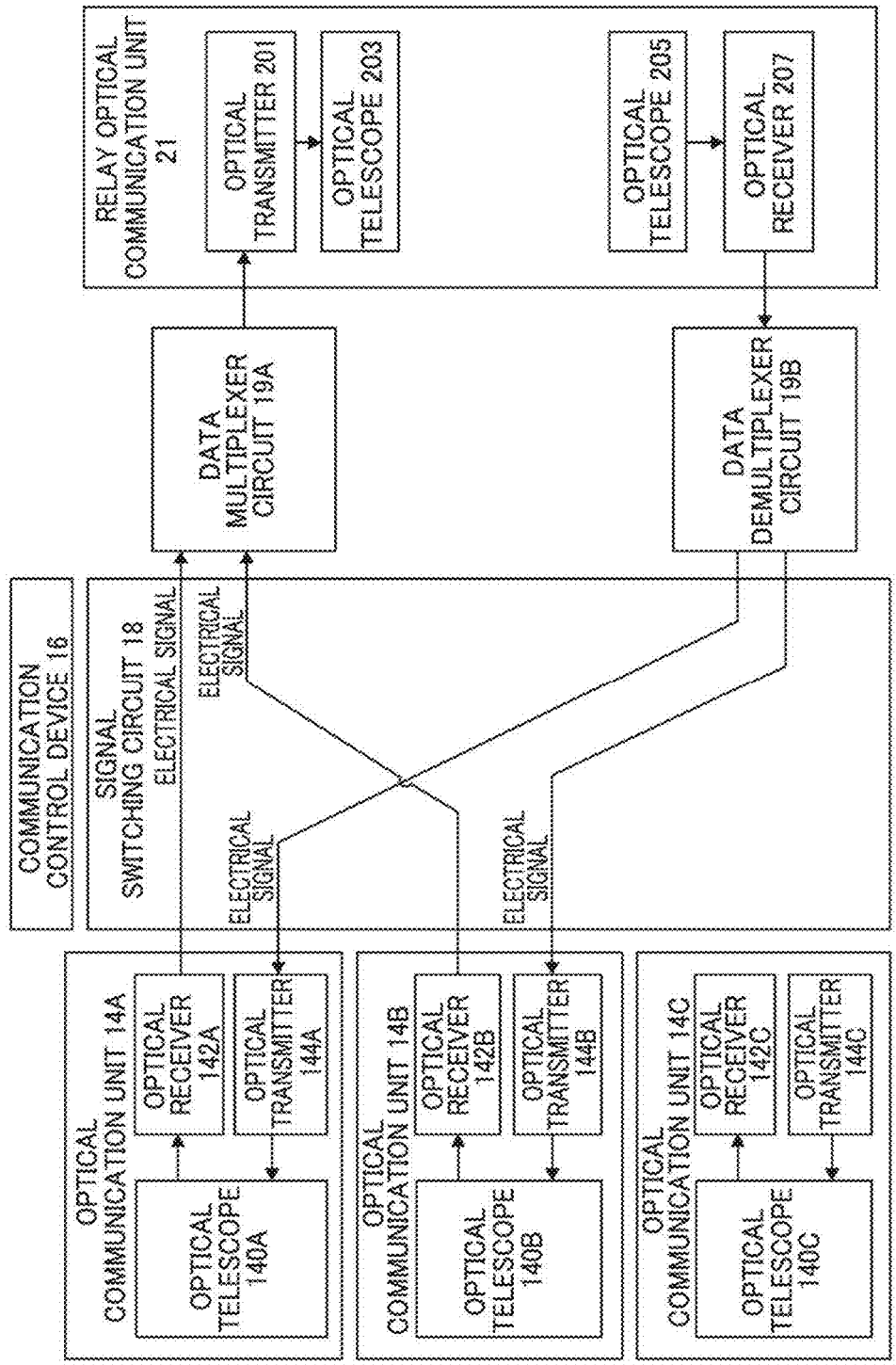
[Fig. 8B]

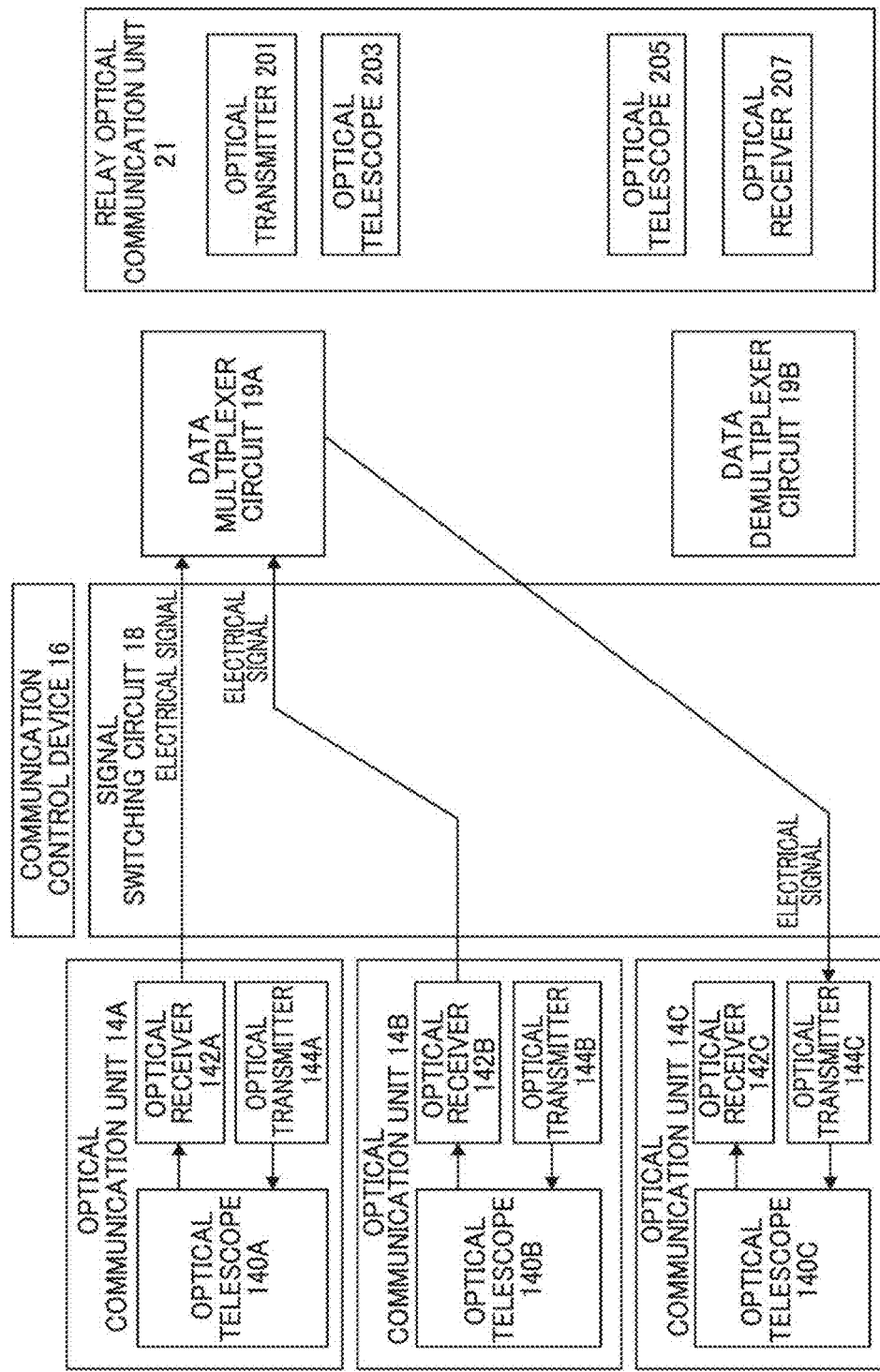
[Fig. 8C]

[Fig. 9]
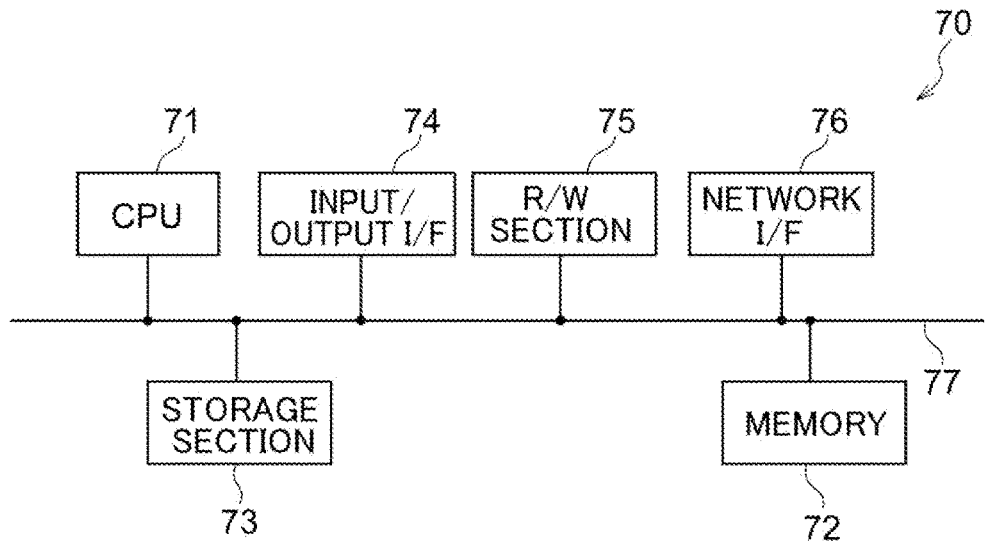
[Fig. 10]
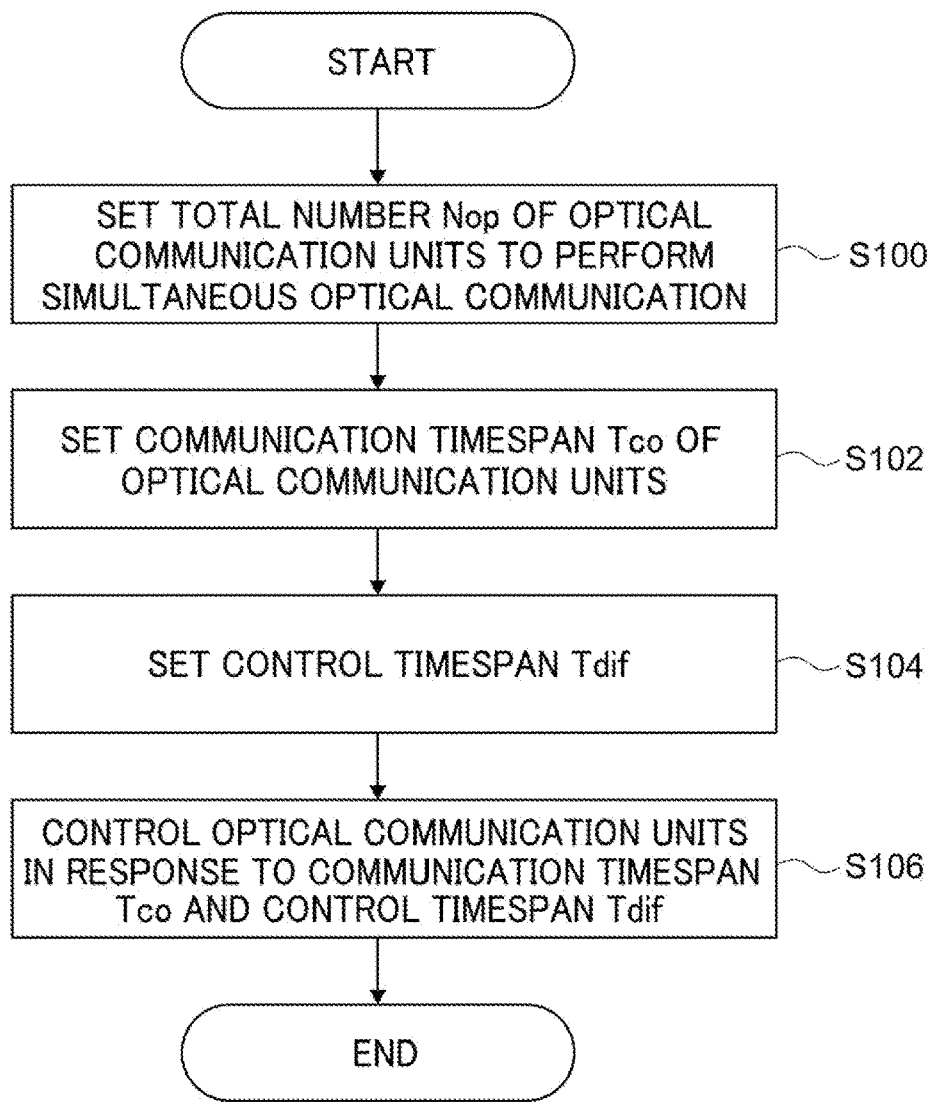

[Fig. 11]
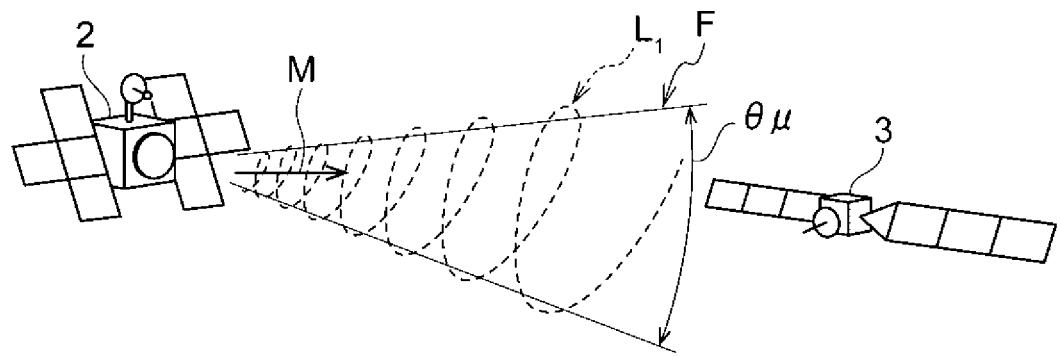
[Fig. 12]
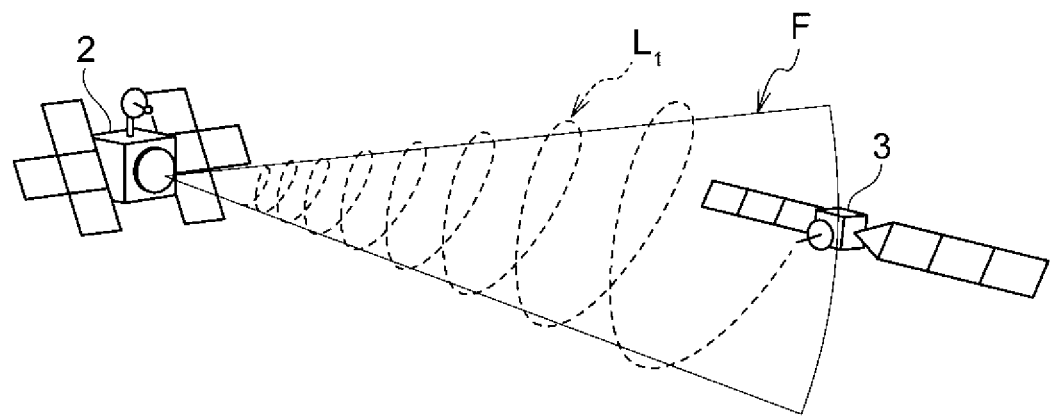
[Fig. 13]
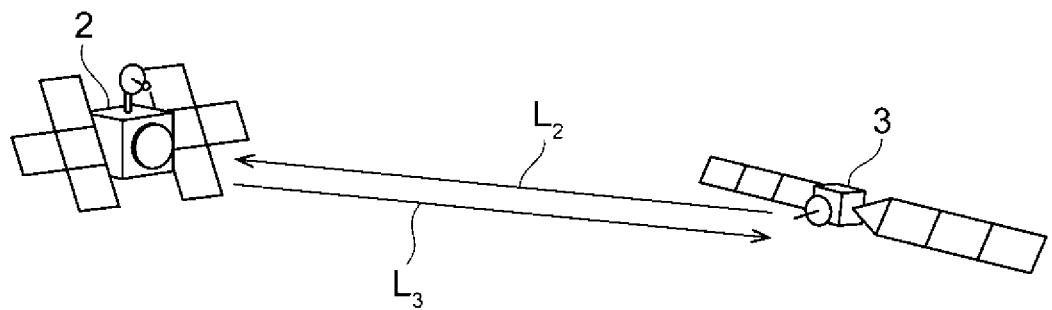

[Fig. 14]
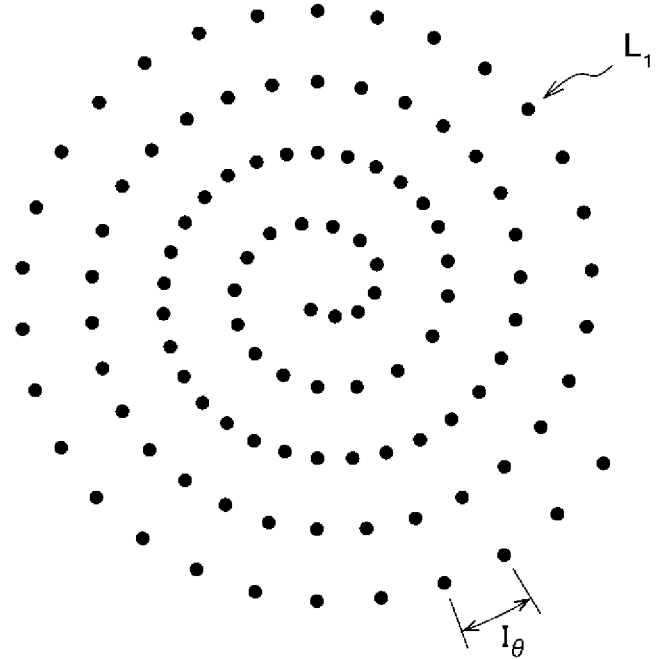

[Fig. 15]
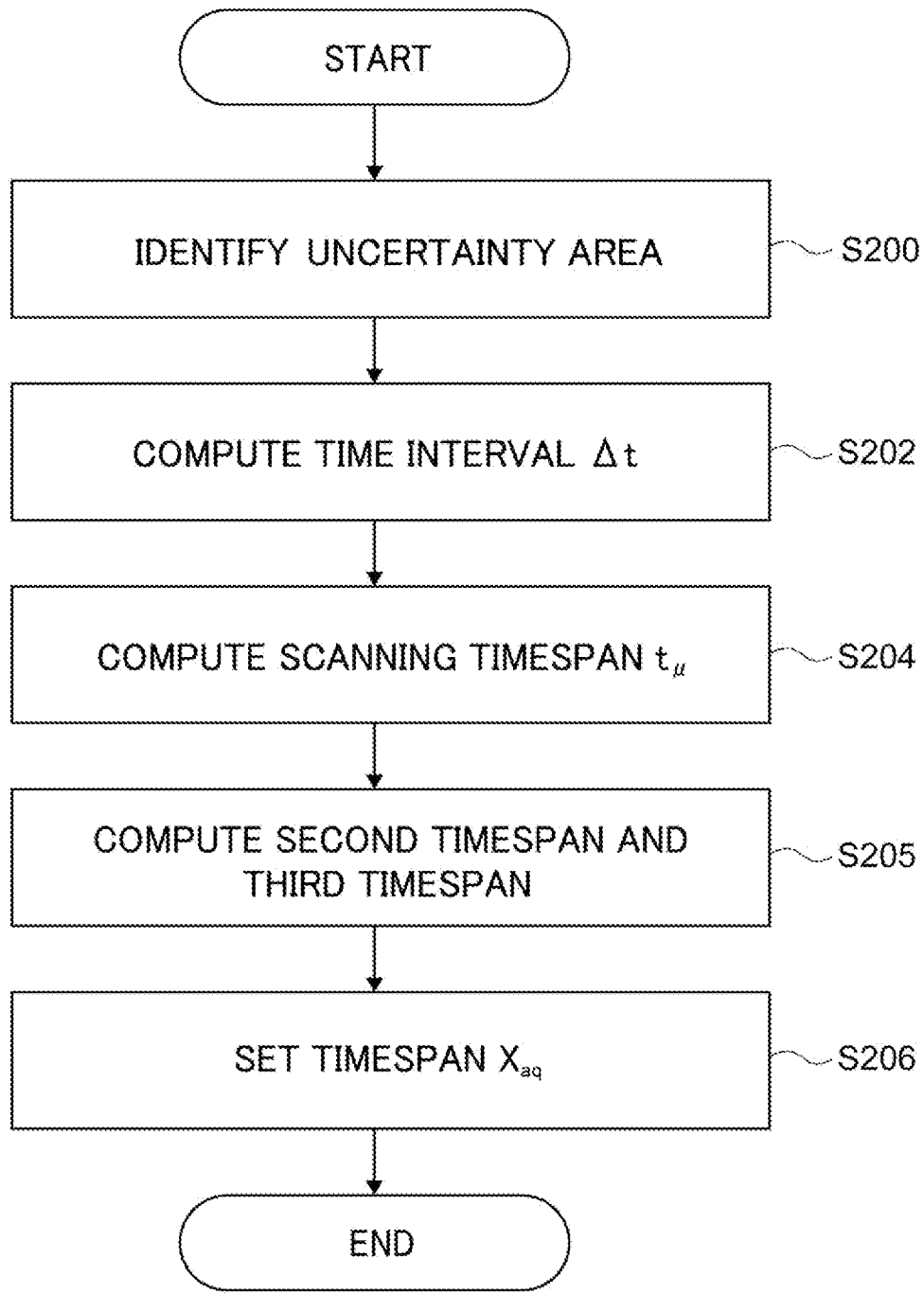

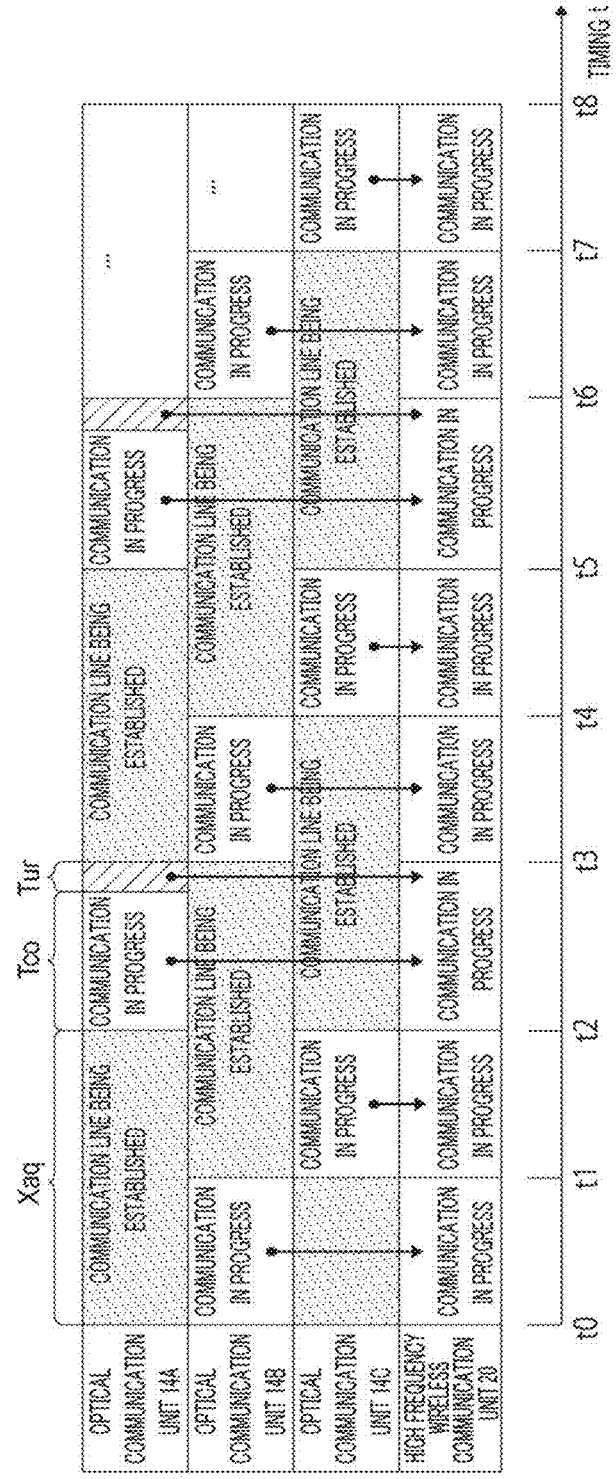

[Fig. 17]
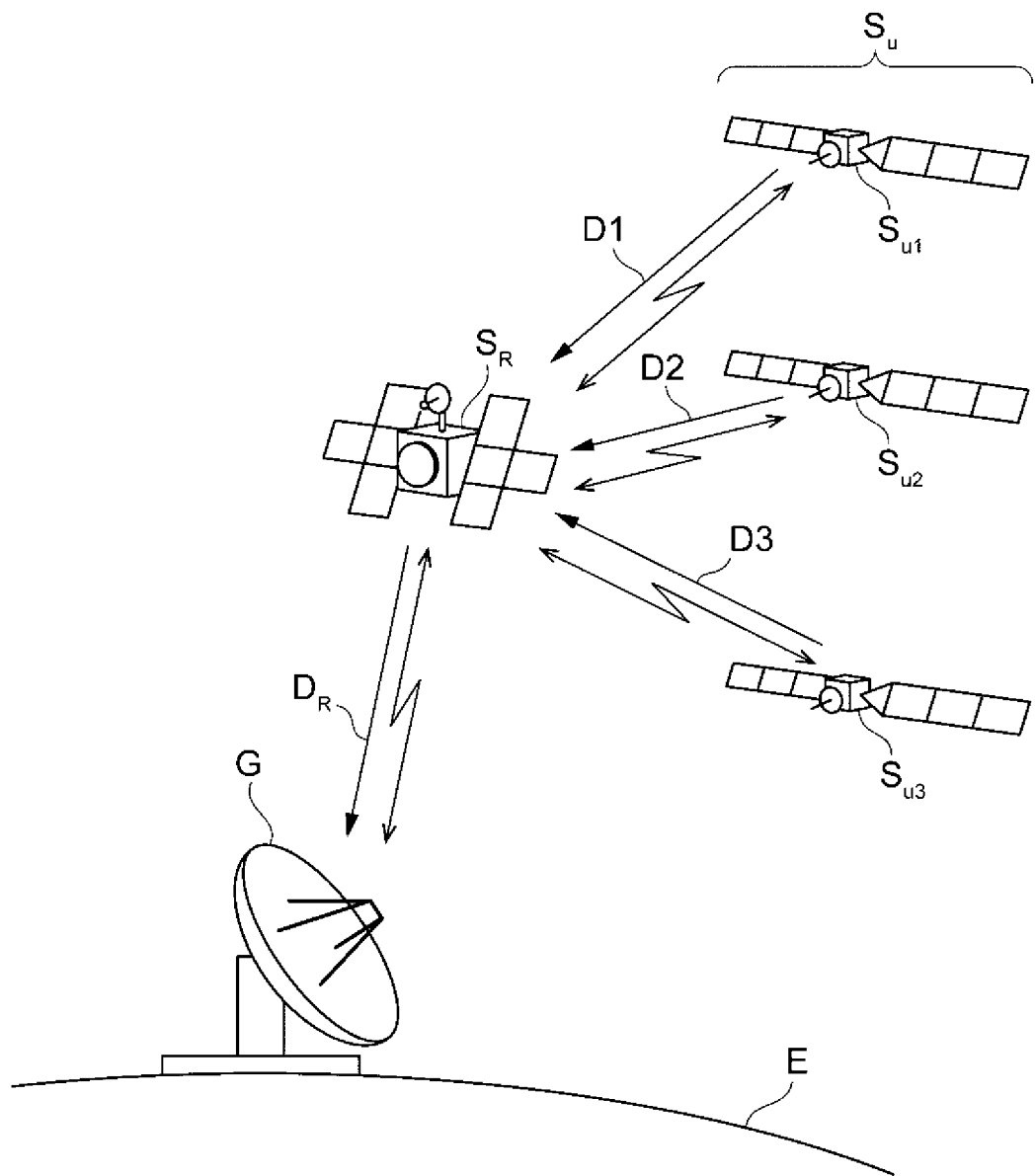

COMMUNICATION CONTROL APPARATUS, COMMUNICATION CONTROL METHOD, COMMUNICATION CONTROL PROGRAM, COMMUNICATION CONTROL SYSTEM, COMMUNICATION RELAY SATELLITE, AND SATELLITE SYSTEM

CROSS-REFERENCE TO RELATED APPLICATIONS

This application is based on PCT filing PCT/JP2021/041809, filed Nov. 12, 2021, which claims priority to JP 2020-189818, filed Nov. 13, 2020, and JP 2021-121038, filed Jul. 21, 2021, each of which are incorporated in their entirety in the present specification by reference herein

TECHNICAL FIELD

The present disclosure relates to a communication control apparatus, a communication control method, a communication control program, a communication control system, a communication relay satellite, and a satellite system.

BACKGROUND ART

There is a known optical downlink system between a remote terminal including n optical communication terminals (OT1 to OTn) and a ground terminal including a cluster of n optical ground base stations (OGS1 to OGSn) respectively connected by n optical downlink channels (DL1 to DLn) or n optical uplink channels (UC1 to UCn) (for example Patent Document 1). The optical downlink system is configured such that the n optical ground base stations (OGS1 to OGSn) are synchronized, due to securing spatial separation as a result of the optical ground base stations (OGS1 to OGSn) being positioned at a specific distance from one another for each of the n optical downlink channels that secure temporal separation as a result of the optical uplink channels (UC1 to UCn) utilizing time division multiplexing. This enables temporal overlap between the optical uplink channels (UC1 to UCn) to be avoided (for example, claims 1 and 8 in Patent Document 1).

There is also a known free space optical communication system including a constellation of several satellites (for example Patent Document 2). This free space optical communication system includes the satellite constellation, each satellite including plural uplink/downlink optical telescopes for performing optical communication with plural ground sites. As a given satellite passes a predetermined ground site, one or more of the uplink/downlink telescopes of the given satellite tracks at least two ground optical telescopes at the predetermined ground site, and the given satellite transmits data to the ground optical telescope with the clearest line of sight with respect to the given satellite (for example, claim 1 in Patent Document 2).

There is also a known mobile satellite communication system that is capable of flexibly handling for example a sudden temporary increase in communication demand (for example Patent Document 3). In this mobile satellite communication system, a flying relay station is deployed that flies at an altitude between several kilometers and several tens of kilometers above a communication area of a low-earth-orbit communication satellite so as to relay communication between the low-orbit communication satellite and a ground or maritime mobile communication terminal. The flying relay station includes a function to communicate with the mobile communication terminal by radio waves, and a function to communicate with the low-earth-orbit communication satellite by laser light. In this mobile satellite communication system, in cases in which a single flying relay station cannot handle an increase of the volume of communication from plural mobile communication terminals within the same communication area, plural flying relay stations are deployed above this communication area, such that the communication between the low-earth-orbit communication satellite and the mobile communication terminals is divided among and relayed by these plural flying relay stations.

Note that Patent Document 3 discloses that, in order for the low-earth-orbit communication satellite to perform parallel simultaneous optical communication with the plural flying relay stations, plural optical antennae for the communication with the plural flying relay stations corresponding to the number of flying relay stations that can be handled may be equipped (for example, paragraph in Patent Document 3).

CITATION LIST

Patent Literature

Patent Document 1: Japanese Patent Application Laid-Open (JP-A) No. 2013-132045
Patent Document 2: Japanese National-Phase Publication No. 2015-524629
Patent Document 3: JP-A No. 2007-13513

SUMMARY OF INVENTION

Technical Problem

However, when a situation is envisaged in which plural artificial satellites (hereafter simply referred to as "satellites") are present in outer space, for each of these plural satellites to communicate independently with a ground station is not realistic. Thus, as illustrated in FIG. 17, a situation may be envisaged in which a communication relay satellite $S_R$ is provided in order to relay communication between satellites $S_U$ and a ground station G on the Earth E, and each of the plural satellites $S_{U1}$, $S_{U2}$, $S_{U3}$ communicates with the ground station G through the communication relay satellite $S_R$. As illustrated in FIG. 17, the communication relay satellite $S_R$ receives data D1, D2, D3 respectively transmitted from the plural satellites $S_{U1}$, $S_{U2}$, $S_{U3}$, and transmits this data D R to the ground station G.

In such a case, a data communication rate (hereafter simply referred to as "data rate") per unit time over a communication line between the communication relay satellite $S_R$ and the ground station G is physically limited. Thus, the data rate of the communication line between the communication relay satellite $S_R$ and the ground station G needs to be not greater than a predetermined value. Thus, for example, even if the communication relay satellite $S_R$ receives data from each of the plural satellites $S_{U1}$, $S_{U2}$, $S_{U3}$, the data aggerating $S_{U1}$, $S_{U2}$, and $S_{U3}$ cannot always be transmitted to the ground station G in a certain time period.

On the other hand, sometimes a communication line between the communication relay satellite $S_R$ and the ground station G has a high data rate, and a large amount of data can be simultaneously transmitted from the communication relay satellite $S_R$ to the ground station G. In such cases, the communication relay satellite $S_R$ can sometimes transmit data received from two or more satellites to the ground station G in a certain time period. In such cases, if a satellite for communicating with the ground station G within a time period were limited to the single satellite $S_{U1}$, the other satellites $S_{U2}$, $S_{U3}$ would be unable to communicate with the ground station G during the time period. This would lead to a low utilization rate of the communication line, despite the communication line between the communication relay satellite $S_R$ and the ground station G having spare capacity.

Note that the above issue is not limited to cases in which the transmission target of data from the communication relay satellite $S_R$ is the ground station G. For example, a similar issue may arise in cases in which the communication relay satellite $S_R$ transmits data to other equipment such as a flying object deployed in the stratosphere or the troposphere.

In the technology of Patent Documents 1 to 3, there is no consideration of a limit value of the data rate between the communication relay satellite and other equipment such as a ground station. For example, although Patent Document 3 describes the low-earth-orbit communication satellite performing parallel simultaneous optical communication with the plural flying relay stations, there is no consideration of a limit value of the data rate between these communication relay satellites and other equipment.

Thus, in conventional technology, when a communication relay satellite relays communication between plural satellites and other equipment such as a ground station, there is a problem that data from a greater possible number of satellites cannot be transmitted to the other equipment while satisfying a limit value of a data rate between the communication relay satellite and the other equipment.

In consideration of the above circumstances, the present disclosure provides a communication control apparatus, a communication control method, a communication control program, a communication control system, a communication relay satellite, and a satellite system that, when a communication relay satellite relays communication between plural satellites and other equipment, enable data from a greater possible number of satellites to be transmitted to the other equipment, while satisfying a limit value of a data rate between the communication relay satellite and the other equipment.

Solution to Problem

A communication control apparatus of a first aspect of the present disclosure is a communication control apparatus configured to relay communication between plural satellites and other equipment. The communication control apparatus includes: plural optical communication sections that are capable of performing parallel optical communication with the plural satellites; an equipment communication section configured to communicate with the other equipment; a setting section configured to set a first data rate that is a sum of limit values of data communication rates per unit time between the plural satellites and the plural optical communication sections, and to set a second data rate that is a limit value of a data communication rate per unit time between the communication control apparatus and the other equipment; and a control section configured to control the plural optical communication sections and the equipment communication section such that data from the plural satellites received by the plural optical communication sections at the first data rate is relay transferred in parallel to the other equipment at the second data rate.

A communication control apparatus of a second aspect of the present disclosure is a communication control apparatus including a control section configured to control communication between a communication relay satellite and plural satellites such that, when the communication relay satellite relays communication between the plural satellites and other equipment, a sum of data rates expressing communication rates per unit time between the plural satellites and the communication relay satellite is not greater than a limit value of a data rate between the communication relay satellite and the other equipment.

Advantageous Effects of Invention

The present disclosure obtains advantageous effects of enabling data from a greater possible number of satellites to be transmitted to the other equipment, while satisfying the limit value of the data rate between the communication relay satellite and the other equipment when the communication relay satellite relays communication between the plural satellites and the other equipment.

BRIEF DESCRIPTION OF DRAWINGS

FIG. 1 is a diagram illustrating an example of a schematic configuration of a satellite system of an exemplary embodiment.

FIG. 2 is a diagram illustrating an example of a schematic configuration of a communication control system of first and second exemplary embodiments.

FIG. 3 is a diagram for explaining communication periods.

FIG. 4 is a diagram for explaining communication periods.

FIG. 5 is a diagram for explaining a signal switching circuit.

FIG. 6 is a diagram for explaining a signal switching circuit.

FIG. 7 is a diagram for explaining a signal switching circuit.

FIG. 8A is a diagram for explaining a signal switching circuit.

FIG. 8B is a diagram illustrating an example of a configuration of a communication control system in a case in which relay communication units are configured by optical communication units.

FIG. 8C is a diagram illustrating an example of a configuration of a communication control system in a case in which an optical communication unit out of plural optical communication units configures a relay communication unit.

FIG. 9 is a schematic block diagram of a computer functioning as a communication control device.

FIG. 10 is a diagram for explaining processing executed by a communication control device.

FIG. 11 is a diagram for explaining satellite acquisition.
FIG. 12 is a diagram for explaining satellite acquisition.
FIG. 13 is a diagram for explaining satellite acquisition.
FIG. 14 is a diagram for explaining satellite acquisition.
FIG. 15 is a diagram for explaining processing executed by a communication control device.

FIG. 16 is a diagram for explaining a modified example of communication.

FIG. 17 is a diagram for explaining a technical problem to be solved.

DESCRIPTION OF EMBODIMENTS

Detailed explanation follows regarding exemplary embodiments, with reference to the drawings.

Satellite System of First Exemplary Embodiment

FIG. 1 is a diagram illustrating a satellite system 1 of an exemplary embodiment. As illustrated in FIG. 1, the satellite system 1 of the present exemplary embodiment includes a communication relay satellite 2, other satellites 3A, 3B, 3C (hereafter simply referred to as "user satellites") that are different to the communication relay satellite 2, and a ground station 4, this being a wireless communication station on Earth. The communication relay satellite 2 and the user satellites 3A, 3B, 3C are satellites. The ground station 4 is an example of other equipment. The ground station 4 installed on the ground is an example of an Earth station that performs wireless ratio communication or optical communication. In cases in which there are plural ground stations installed, the ground station 4 may be a collective name for these ground stations.

Each of the user satellites 3A, 3B, 3C orbits in a first orbit in outer space. The communication relay satellite 2 orbits in a second orbit in outer space. The altitudes of the first orbit and the second orbit are lower than the altitude of a geosynchronous orbit (with an altitude of approximately 36,000 km) with respect to the Earth's surface. Note that a geostationary orbit (GEO) is an example of a geosynchronous orbit. The altitude of the second orbit from the Earth's surface is higher than the altitude of the first orbit from the Earth's surface. The first orbit may for example be a low earth orbit (LEO). The altitude of the apogee of the low earth orbit may for example be an altitude of from 20 km to 2,000 km from the Earth's surface. The second orbit may for example be a medium earth orbit (MEO). The altitude of the apogee of the medium earth orbit may for example be an altitude of from 1,000 km to approximately 360,000 km from the Earth's surface.

Each of the plural user satellites 3A, 3B, 3C performs wireless communication with the communication relay satellite 2, and perform data communication with the ground station 4 via the communication relay satellite 2. The communication relay satellite 2 relays data communication in real time between the plural user satellites 3A, 3B, 3C and the ground station 4 by performing data communication with the plural user satellites 3A, 3B, 3C and simultaneously performing parallel data communication with the ground station 4. The ground station 4 is connected to a server 6 over a network 5 such as the Internet, and the server 6 receives data acquired by the user satellites 3A, 3B, 3C via the ground station 4. This enables the server 6 to acquire data acquired by the user satellites 3A, 3B, 3C while being located on the ground. The server 6 also includes functionality required in order to operate the satellite system in FIG. 1. Note that in cases in which any one user satellite out of the plural user satellites 3A, 3B, 3C is being referred to, this user satellite is simply referred to as the "user satellite 3".

FIG. 2 is a diagram illustrating a detailed example of a configuration of a communication control system 12 of an exemplary embodiment. As illustrated in FIG. 2, the communication control system 12 includes plural optical communication units 14A, 14B, 14C, a communication control device 16, a signal switching circuit 18, a data multiplexer circuit 19A, a data demultiplexer circuit 19B, and a high frequency wireless communication unit 20. The communication control system 12 is installed to the communication relay satellite 2. Note that in cases in which any one optical communication unit of the plural optical communication units 14A, 14B, 14C is being referred to, this optical communication unit is simply referred to as the "optical communication unit 14". Note that the number of user satellites 3 is not limited to three as in the example in FIG. 2, and may be greater than three. Furthermore, the number of user satellites 3 does not need to be the same as the number of optical communication units 14, and may be greater than the number of optical communication units 14. The user satellites 3 may be part of a satellite constellation system that realizes a particular function or service, being coordinated with plural other satellites.

Optical Communication Units

As illustrated by the optical communication unit 14A in FIG. 2, the optical communication unit 14A includes an optical telescope 140A, an optical receiver 142A, and an optical transmitter 144A. Note that configurations of the optical communication units 14B, 14C illustrated in FIG. 2 are similar to that of the optical communication unit 14A. Thus, explanation only follows regarding configuration of the optical communication unit 14A. Note that the optical communication unit is an example of an optical communication section of the present disclosure.

The optical telescope 140A receives and transmits laser light from and to the user satellites 3A, 3B, 3C. Note that the user satellite with which the optical communication unit 14A performs optical communication is not limited to the user satellite 3A. The optical communication unit 14A may also perform optical communication with the user satellite 3B and the user satellite 3C. The optical telescope 140A includes an aperture (not illustrated in the drawings) serving as an entry and exit point for laser light. The optical telescope 140A also includes a beam steering mirror (not illustrated in the drawings). The path of light is adjusted by the beam steering mirror.

The optical telescope 140A outputs laser light received from another satellite to the optical receiver 142A through the beam steering mirror. The optical telescope 140A also outputs laser light output from the optical transmitter 144A, described below, to another satellite through the beam steering mirror.

The optical receiver 142A acquires a digital electrical signal corresponding to the laser light received by the optical telescope 140A by performing optical demodulation on the laser light output from the optical telescope 140A. The optical receiver 142A then outputs the digital electrical signal to the high frequency wireless communication unit 20, described later.

The optical transmitter 144A acquires laser light corresponding to a digital electrical signal by performing optical modulation on a digital electrical signal output from the high frequency wireless communication unit 20, described later. The optical transmitter 144A then outputs the laser light to the optical telescope 140A.

Communication Control Device

As illustrated in FIG. 2, the communication control device 16 includes a setting section 160 and a control section 162.

A data rate when the communication relay satellite 2 transfers data to the ground station 4 is physically limited. Specifically, the data rate when the communication relay satellite 2 transfers data to the ground station 4 must be not greater than a predetermined limit value. Thus, even if the communication relay satellite 2 receives data in parallel from each of the plural user satellites 3A, 3B, 3C, the communication relay satellite 2 cannot always transfer this data to the ground station 4 in a certain time period.

On the other hand, in cases in which a communication line between the communication relay satellite 2 and the ground station 4 has spare capacity with respect to the data rate limit value, data transmitted from two or more of the user satellites 3 can sometimes be transferred to the ground station 4 in the certain time period. In such cases, if the targets for performing relay transmission of data from the communication relay satellite 2 to the ground station 4 have been limited to a single user satellite 3 and a single optical communication unit 14, the communication line between the communication relay satellite 2 and the ground station 4 would have a low utilization rate, which would not be optimal.

Moreover, if the number of optical communication units 14 that perform relay transfer of data to the ground station 4 were limited to a single optical communication unit 14 communicating with, for example, the user satellite 3A, the other user satellites 3B, 3C would be unable to transmit data to the ground station 4 until the completion of the communication between the user satellite 3A and the communication relay satellite 2.

To address this, the communication control device 16 of the present exemplary embodiment controls communication between the plural optical communication units 14A, 14B, 14C and the plural user satellites 3A, 3B, 3C such that, when the communication relay satellite 2 is relaying communication between the plural user satellites 3A, 3B, 3C and the ground station 4, a sum of data rates between the plural user satellites 3A, 3B, 3C and the plural optical communication units 14A, 14B, 14C is not greater than the limit value of the data rate between the high frequency wireless communication unit 20 and the ground station 4. Specifically, the communication control device 16 of the present exemplary embodiment controls the communication such that, when data transmitted from the plural user satellites 3A, 3B, 3C is received by the plural optical communication units 14A, 14B, 14C, the sum of the data rates between the plural user satellites 3A, 3B, 3C and the plural optical communication units 14A, 14B, 14C is not greater than the limit value of the data rate between the high frequency wireless communication unit 20 and the ground station 4.

More specifically, first, the communication control device 16 sets a number of user satellites 3 to perform optical communication simultaneously or in parallel with the communication relay satellite 2 so as not to exceed the limit value of the data rate between the communication relay satellite 2 and the ground station 4. The communication control device 16 then controls the respective equipment such that data received from the optical communication target user satellites 3 is transmitted to the ground station 4 in a time period in which optical communication to receive the data from the optical target user satellites 3 is being performed.

Detailed Explanation Follows Below.

Consider a case in which a total number of optical communication units installed to the communication relay satellite 2 is $N_U$ (units), a data rate limit value of a data communication line between a single user satellite 3 and a single optical communication unit 14 is $R_U$ (bps: bit per second), a timespan required for a single optical communication unit 14 to establish a communication line in order to perform data communication with a single user satellite 3 is $X_{aq}$ (s: second), and a data rate limit value during data communication when transmitting data from the communication relay satellite 2 to the ground station 4 is $R_G$ (bps). In such cases, a condition between $R_G$ and $R_U$ is expressed by Equation (1) below. Note that the data rate limit value referred to here is not confined to the data rate limitation specified in the design specifications of the optical communication units 14, and may be a data rate limitation determined based on operational reasons. In cases in which the data rate limit values of the respective optical communication units 14 are not the same, a fixed value that is not greater than a maximum value out of these data rate limit values may be set as $R_G$.

[Math. 1]

$$R_G \geq R_U \quad (1)$$

A maximum number $N_{op}$ of optical communication units to perform simultaneous optical communication is set by Equation (2) below.

[Math. 2]

$$N_{op} = \left[\frac{R_G}{R_U}\right] \quad (2)$$

When $N_{op} < N_U$, a communication timespan $T_{co}$ (s) expressing a timespan for performing data communication over a communication line between a single user satellite 3 and a single optical communication unit 14 is set according to Equation (3) below. This enables data from a greater possible number of user satellites 3 to be transmitted to the ground station 4.

[Math. 3]

$$T_{co} = \frac{X_{aq}}{N_U - N_{op}} \times N_{op} \quad (3)$$

For example, consider a case in which the maximum number of optical communication units to perform simultaneous optical communication is computed to be $N_{op}=1$ according to Equation (2). In such a case, the communication control device 16 may for example control the plural optical communication units 14A, 14B, 14C such that optical communication is performed between the user satellite 3A and the optical communication unit 14A for the communication timespan $T_{co}(s)$, after which optical communication is performed between the user satellite 3B and the optical communication unit 14B for the communication timespan $T_{co}(s)$.

As another example, consider a case in which the maximum number of optical communication units to perform simultaneous optical communication is computed to be $N_{op}=2$ according to Equation (2). In such a case, the communication control device 16 may for example control the plural optical communication units 14A, 14B, 14C such that, whilst optical communication is being performed between the user satellite 3A and the optical communication unit 14A for the communication timespan $T_{co}(s)$, optical communication is also performed between the user satellite 3B and the optical communication unit 14B for the communication timespan $T_{co}(s)$.

Since the maximum number $N_{op}$ of optical communication units to perform simultaneous optical communication is computed according to Equation (2), the sum of the data rates between the plural user satellites 3A, 3B, 3C and the plural optical communication units 14A, 14B, 14C is not greater than the data rate limit value between the communication relay satellite 2 and the ground station 4. This enables data from a greater possible number of user satellites 3 to be transmitted to the ground station 4 in a single transmission, while satisfying the limit value of the data rate between the communication relay satellite 2 and the ground station 4. Moreover, the utilization rate of the communication line between the communication relay satellite 2 and the ground station 4 can be improved. Note that the sum of the data rates between the plural user satellites 3A, 3B, 3C and the plural optical communication units 14A, 14B, 14C is an example of a first data rate of the present disclosure. Moreover, the limit value $R_G$ (bps) of the data communication rate per unit time between the communication control device 16 and the ground station 4 is an example of a second data rate of the present disclosure.

Note that the communication control device 16 also controls such that timings to start each optical communication between a single optical communication unit 14 and a single user satellite 3 is offset each other by a timespan $T_{dif}$(s) computed according to Equation (4) below. As the result, the communication timespans $T_{co}$(s) is allocated for the respective optical communication units 14.

[Math. 4]

$$T_{dif} = \frac{T_{co}}{N_{op}} \quad (4)$$

FIG. 3 is an example of a control sequence in a case in which the number of optical communication units installed to the communication relay satellite 2 is 3 (namely, $N_U$=3), and the maximum number of optical communication units to perform simultaneous optical communication is computed to be $N_{op}$=1. In the example illustrated in FIG. 3, since the number of optical communication units to perform optical communication is $N_{op}$=1, $T_{dif}$=$T_{co}$. Thus, as illustrated in FIG. 3, the communication start timing of the optical communication unit 14B for example is after the optical communication unit 14A has ended its optical communication.

As illustrated in FIG. 3, the high frequency wireless communication unit 20 of the communication relay satellite 2 performs data transfer to the ground station 4 in parallel with data reception from the user satellites 3 by the optical communication units 14, so as to relay the data in real time. Namely, while optical communication is being performed in which an optical communication unit 14 of the communication relay satellite 2 receives data from a user satellite 3 during the communication timespan $T_{co}$(s), the high frequency wireless communication unit 20 starts transfer of this received data to the ground station 4.

For example, as illustrated in FIG. 3, data from a user satellite 3 received by the optical communication unit 14A between a timing t0 and a timing t1 starts to be transferred to the ground station 4 by the high frequency wireless communication unit 20 between the timing t0 and the timing t1. Moreover, data from a user satellite 3 received by the optical communication unit 14B between the timing t1 and a timing t2 starts to be transferred to the ground station 4 by the high frequency wireless communication unit 20 between the timing t1 and the timing t2. Moreover, data from a user satellite 3 received by the optical communication unit 14C between the timing t2 and a timing t3 starts to be transferred to the ground station 4 by the high frequency wireless communication unit 20 between the timing t2 and the timing t3. Note that there is a slight delay between a timeframe during which an optical communication unit 14 receives data and a timing at which the high frequency wireless communication unit 20 starts to transfer the data to the ground station 4. Moreover, the user satellite 3 with which an optical communication unit 14 performs optical communication is not fixed. For example, the user satellite 3 with which the optical communication unit 14A performs optical communication is not fixed as the user satellite 3A. For example, the optical communication unit 14A may also perform optical communication with the user satellite 3B or the user satellite 3C. The optical communication unit 14A may for example perform optical communication with a first user satellite between the timing t0 and the timing t1, and perform optical communication with a second user satellite between the timing t3 and a timing t4.

FIG. 4 is an example of a control sequence in a case in which the maximum number of optical communication units to perform simultaneous optical communication is computed to be $N_{op}$=2. In the example illustrated in FIG. 4, since the number of optical communication units to perform optical communication is $N_{op}$=2, $T_{dif}$=$T_{co}$/2. Thus, for example, the communication start timing of the optical communication unit 14B is after $T_{dif}$=$T_{co}$/2 has elapsed since the optical communication unit 14A started optical communication.

For example, as illustrated in FIG. 4, data from a user satellite 3 received by the optical communication unit 14A between the timing t0 and the timing t1, and data from a user satellite 3 received by the optical communication unit 14C between the timing t0 and the timing t1, is transferred to the ground station 4 by the high frequency wireless communication unit 20 between the timing t0 and the timing t1. Moreover, data from a user satellite 3 received by the optical communication unit 14A between the timing t1 and the timing t2, and data from a user satellite 3 received by the optical communication unit 14B between the timing t1 and the timing t2, is transferred to the ground station 4 by the high frequency wireless communication unit 20 between the timing t1 and the timing t2. Moreover, data from a user satellite 3 received by the optical communication unit 14B between the timing t2 and the timing t3, and data from a user satellite 3 received by the optical communication unit 14C between the timing t2 and the timing t3, is transferred to the ground station 4 by the high frequency wireless communication unit 20 between the timing t2 and the timing t3.

Note that in cases in which the maximum number of optical communication units to perform simultaneous optical communication is computed to be $N_{op}$=3, $N_U$=$N_{op}$=3, and so Equation (3) cannot be applied. In such cases, the control section 162, described later, is able to control such that all of the optical communication units 14A, 14B, 14C installed to the communication control system 12 perform optical communication either simultaneously or at a desired timing.

The setting section 160 sets the first data rate, this being the sum of the limit values $R_U$ of the data communication rates per unit time between the plural user satellites 3A, 3B, 3C and the plural optical communication units 14A, 14B, 14C. The setting section 160 also sets the second data rate, this being the limit value $R_G$ of the data communication rate per unit time between the communication relay satellite 2 and the ground station 4. Next, the setting section 160 sets various control information based on these data rates.

First, the setting section 160 sets the maximum number $N_{op}$ of optical communication units to perform simultaneous optical communication according to Equation (2), based on the limit values $R_U$ of the data rates of the optical communication units 14 and the limit value $R_G$ of the data rate of the communication line from the communication relay satellite 2 to the ground station 4.

Next, the setting section 160 sets the communication timespan $T_{co}$ according to Equation (3), based on the timespan $X_{aq}$ required for an optical communication unit 14 to establish a communication line with a user satellite 3, the total number $N_U$ of optical communication units, and the maximum number $N_{op}$ of optical communication units to perform simultaneous optical communication. Note that the timespan $X_{aq}$ required for an optical communication unit 14 to establish a communication line with a user satellite 3 is preset. The timespan $X_{aq}$ required for an optical communication unit 14 to establish a communication line with a user satellite 3 is computed as the timespan required for the communication relay satellite 2 to acquire the user satellite 3. Note that in cases in which the timespan required for an optical communication unit 14 to establish a communication line with a user satellite 3 is different for each of the plural user satellites 3, a maximum value (timespan) out of these timespans may be set as $X_{aq}$.

Next, the setting section 160 sets the control timespan $T^{dif}$ to control the communication start timings according to Equation (4) based on the communication timespan $T_{co}$ and the maximum number $N_{op}$ of optical communication units to perform simultaneous optical communication. Note that time information serving as a reference time information for the satellite system 1 is acquired from measurement satellites such as a GPS (Global Positioning System). Specifically, the communication relay satellite 2 and the user satellites 3 of the satellite system 1 execute various control using the timing information acquired from measurement satellites such as a GPS as the common reference time information of the satellite system 1.

The control section 162 controls the plural optical communication units 14A, 14B, 14C and the high frequency wireless communication unit 20, described later, such that the data from the plural user satellites 3A, 3B, 3C received by the plural optical communication units 14A, 14B, 14C at the first data rate is relay transferred in parallel to the ground station 4 at the second data rate. Thus, the $N_{op}$ optical communication units 14 are controlled such that parallel optical communication is performed between the $N_{op}$ optical communication units 14 and the plural user satellites 3. Specifically, the control section 162 controls the plural optical communication units 14A, 14B, 14C based on the communication timespan $T_{co}$ and the control timespan $T_{dif}$ set by the setting section 160. More specifically, the control section 162 controls such the communication timespan between one user satellite 3 out of the plural user satellites 3A, 3B, 3C and one optical communication unit 14 out of the plural optical communication units 14A, 14B, 14C is the communication timespan $T_{co}$. The control section 162 also controls such that, after the control timespan $T_{dif}$ has elapsed since this communication between the user satellite 3 and the optical communication unit 14 has started, communication starts between another user satellite 3 out of the plural user satellites 3A, 3B, 3C and another optical communication unit 14 out of the plural optical communication units 14A, 14B, 14C.

Note that in cases in which the maximum number of optical communication units to perform simultaneous optical communication is computed to be $N_{op}=3$, the control section 162 is able to control such that all of the optical communication units 14A, 14B, 14C installed to the communication control system 12 perform optical communication with the plural user satellites 3 either simultaneously or at a desired timing.

The control section 162 controls optical communication of the plural optical communication units 14A, 14B, 14C by outputting control signals in order to realize the above-described control processing to the plural optical communication units 14A, 14B, 14C and to the signal switching circuit 18, described below.

Signal Switching Circuit

The signal switching circuit 18 switches signal paths between the plural optical communication units 14A, 14B, 14C and signal paths between the plural optical communication units 14A, 14B, 14C and the high frequency wireless communication unit 20, described later, in response to control signals output from the communication control device 16.

FIG. 5 to FIG. 8A are diagrams for explaining the signal switching circuit 18. The signal switching circuit 18 switches electrical signal paths by changing its internal circuit path in response to a control signal output by the communication control device 16. Signal paths between the plural optical communication units 14A, 14B, 14C and the high frequency wireless communication unit 20, described later, are switched as a result. For example, as illustrated in FIG. 5, the signal switching circuit 18 may set an internal circuit path and switch signal paths such that the optical communication unit 14A and the optical communication unit 14B are electrically connected to the high frequency wireless communication unit 20. Note that in the example illustrated in FIG. 5, data is multiplexed by the data multiplexer circuit 19A, and multiplexed data is demultiplexed by the data demultiplexer circuit 19B, such that the optical communication unit 14A and the optical communication unit 14B are able to perform simultaneous communication in parallel with one another.

Alternatively, as illustrated in FIG. 6, the signal switching circuit 18 may switch signal paths such that that the optical communication unit 14A and the optical communication unit 14C are electrically connected to the high frequency wireless communication unit 20. Note that in the example illustrated in FIG. 6, data is multiplexed by the data multiplexer circuit 19A, and multiplexed data is demultiplexed by the data demultiplexer circuit 19B, such that the optical communication unit 14A and the optical communication unit 14C are able to perform simultaneous communication in parallel with one another.

Alternatively, as illustrated in FIG. 7, the signal switching circuit 18 may switch signal paths such that that the optical communication unit 14A, the optical communication unit 14B, and the optical communication unit 14C are electrically connected to the high frequency wireless communication unit 20. Note that in the example illustrated in FIG. 7, data is multiplexed by the data multiplexer circuit 19A, and multiplexed data is demultiplexed by the data demultiplexer circuit 19B, such that the optical communication unit 14A, the optical communication unit 14B, and the optical communication unit 14C are able to perform simultaneous communication in parallel with one another.

Alternatively, as illustrated in FIG. 8A, the signal switching circuit 18 may switch signal paths such that that the optical communication unit 14A and the optical communication unit 14B are electrically connected to one another. Note that the example in FIG. 8A is an example of a case in which the communication relay satellite 2 relays data communication between user satellites. For example, a case may be envisaged in which optical communication is performed between the optical communication unit 14A and the user satellite 3A, and optical communication is also performed between the optical communication unit 14B and the user satellite 3B. In such a case, as illustrated in FIG. 8A, the optical communication unit 14A receives data from the user satellite 3A, and this data is transferred to the user satellite 3B via the optical communication unit 14B. Moreover, the optical communication unit 14B receives data from the user satellite 3B, and this data is transferred to the user satellite 3A via the optical communication unit 14A. The communication relay satellite 2 is able to relay data communication between the user satellites in this manner.

Data Multiplexer Circuit and Data Demultiplexer Circuit

As illustrated in FIG. 5 to FIG. 8A, the data multiplexer circuit 19A multiplexes data so as to enable optical communication by plural optical communication units. As illustrated in FIG. 5 to FIG. 8A, the data demultiplexer circuit 19B demultiplexes multiplexed data so as to enable optical communication by plural optical communication units.

High Frequency Wireless Communication Unit

The high frequency wireless communication unit 20 illustrated in FIG. 5 to FIG. 8A is an example of a relay communication unit that enables the communication relay satellite 2 to perform communication with the ground station 4 and so on. Note that a relay communication unit is an example of an equipment communication section of the present disclosure. The high frequency wireless communication unit 20 includes the high frequency modulator circuit 200, a high frequency transmission antenna 201 (see FIG. 2: not illustrated in FIG. 5 to FIG. 8A), the high frequency transmitter 202, a high frequency reception antenna 203 (see FIG. 2: not illustrated in FIG. 5 to FIG. 8A), the high frequency receiver 204, and the high frequency demodulator circuit 206. The high frequency wireless communication unit 20 modulates data acquired by the plural optical communication units 14A, 14B, 14C and transmits this data to the ground station 4. The high frequency wireless communication unit 20 also demodulates data transmitted from the ground station 4 and passes this data to the plural optical communication units 14A, 14B, 14C.

The high frequency modulator circuit 200 modulates a digital electrical signal output from an optical communication unit 14, and outputs this to the high frequency transmitter 202.

The high frequency transmitter 202 converts the signal modulated by the high frequency modulator circuit 200 to a high frequency signal, and amplifies this signal.

The high frequency transmission antenna 201 emits the high frequencies output by the high frequency transmitter 202 toward the ground station 4.

The high frequency reception antenna 203 receives high frequencies transmitted by the ground station 4.

The high frequency receiver 204 extracts a modulated signal from the high frequencies received by the high frequency reception antenna 203 and outputs the modulated signal.

The high frequency demodulator circuit 206 demodulates the modulated signal output by the high frequency receiver 204 and converts this into a digital electrical signal.

Note that although a case in which the high frequency wireless communication unit 20 is employed as example of a relay communication unit is described as an example in the present exemplary embodiment, an optical communication unit may be employed as the relay communication unit for performing wireless communication with the ground station 4. In cases in which the relay communication unit is configured by an optical communication unit, optical communication is performed between the communication relay satellite 2 and the ground station 4. In such cases, data communication is performed in parallel between the plural user satellites 3A, 3B, 3C and the plural optical communication units 14, data received by each of the plural optical communication units 14 is multiplexed, and optical communication is performed between the optical communication unit serving as the relay communication unit and the ground station 4.

FIG. 8B illustrates an example of a configuration of a communication control system in a case in which the relay communication unit is configured by an optical communication unit. In the case of FIG. 8B, for example, data from the user satellite 3A received by the optical communication unit 14A and data from the user satellite 3B received by the optical communication unit 14B are multiplexed by the data multiplexer circuit 19A. An optical transmitter 201 and an optical telescope 203 of a relay optical communication unit 21 then transfers the data that has been multiplexed by the data multiplexer circuit 19A to the ground station 4 using optical communication.

Moreover, an optical telescope 205 and an optical receiver 207 of the relay optical communication unit 21 receive data transferred from the ground station 4 using optical communication. The data demultiplexer circuit 19B demultiplexes the data transferred from the ground station 4. The optical communication unit 14A and the optical communication unit 14B may then for example transfer the data that has been demultiplexed by the data demultiplexer circuit 19B to the user satellite 3A and the user satellite 3B respectively.

Note that the relay communication unit that performs data communication with the ground station 4 may be configured by at least one optical communication unit out of the plural optical communication units 14. FIG. 8C illustrates an example of a configuration of a communication control system in a case in which the optical communication unit 14C out of the plural optical communication units 14A, 14B, 14C configures the relay communication unit. In the case in FIG. 8C, the optical communication unit 14C functions as the relay communication unit, and so optical communication is performed between the optical communication unit 14C configuring the relay communication unit and the ground station 4. Note that in the case in FIG. 8C, since the optical communication unit 14C out of the plural optical communication units 14A, 14B, 14C configures the relay communication unit, the number of optical communication units for performing data communication with the user satellites 3 is reduced by one. Thus, in the case in FIG. 8C, in cases in which data communication between the plural user satellites 3 and the plural optical communication units 14 is performed in parallel, 1 needs to be subtracted from the total number of optical communication units to obtain $N_U$ in Equation (3).

The communication control device 16 of the communication control system 12 may for example be realized by a computer 70 such as that illustrated in FIG. 9. The computer 70 includes a central processing unit (CPU) 71, memory 72 serving as a temporary storage region, and a non-volatile storage section 73. The computer 70 also includes an input/output interface (I/F) 74 to which an input/output device and so on (not illustrated in the drawings) are connected, and a read/write (R/W) section 75 that controls reading and writing of data with respect to a recording medium. The computer 70 also includes a network interface (I/F) 76 that enables the communication control system 12 to connect to a ground communication system such as the internet. The CPU 71, the memory 72, the storage section 73, input/output I/F 74, the R/W section 75, and the network I/F 76 are connected to each other through a bus 77.

The storage section 73 may by realized by a hard disk drive (HDD), a solid state drive (SSD), flash memory, or the like. A program for causing the computer 70 to function is stored in the storage section 73 serving as a storage medium. The CPU 71 reads the program from the storage section 73, expands the program in the memory 72, and sequentially execute processes included in the program.

The functionality realized by the program may for example be realized by semiconductor integrated circuit such as an application specific integrated circuit (ASIC).

Moreover, the respective equipment included in the communication control system 12 may be realized by the computer 70 illustrated in FIG. 9.

Operation of Communication Control System 12

Next, explanation follows regarding operation of the communication control system 12 of the present exemplary embodiment. The communication control device 16 executes the communication control processing routine illustrated in FIG. 10 when the communication control system 12 is actuated and receives an instruction signal instructing the start of optical communication between the plural user satellites 3A, 3B, 3C and the communication relay satellite 2.

At step S100, the setting section 160 sets the maximum number $N_{op}$ of optical communication units to perform simultaneous optical communication according to Equation (2) based on the limit values $R_U$ of the data rates of the optical communication units 14 and the data rate limit value $R_G$ of the communication line from the communication relay satellite 2 to the ground station 4. Note that the setting section 160 acquires this data by reading the data rate limit values $R_U$ and the data rate limit value $R_G$ from a predetermined storage section inside the communication control device 16 or from the memory 72.

At step S102, the setting section 160 sets the communication timespan $T_{co}$ according to Equation (3) based on the timespan $X_{aq}$ required for an optical communication unit 14 to establish a communication line with a user satellite 3, the total number $N_U$ of optical communication units, and the maximum number $N_{op}$ of optical communication units set at step S100. Note that the setting section 160 can acquire the timespan $X_{aq}$ from a predetermined storage section inside the communication control device 16 or from the memory 72.

At step S104, the setting section 160 sets the control timespan $T_{dif}$ to control the communication start timings according to Equation (4) based on the communication timespan $T_{co}$ set at step S102 and the maximum number $N_{op}$ of optical communication units set at step S100.

At step S106, the control section 162 controls the plural optical communication units 14A, 14B, 14C based on the communication timespan $T_{co}$ set at step S102 and the control timespan $T_{dif}$ set at step S104.

Specifically, the control section 162 controls such that the communication timespan between the user satellite 3A serving as an example of a first satellite and the optical communication unit 14A serving as an example of a first optical communication unit is the communication timespan $T_{co}$. The control section 162 also controls such that, after the control timespan $T_{dif}$ has elapsed since this communication between the user satellite 3A and the optical communication unit 14A started, communication starts between the user satellite 3B serving as an example of a second satellite and the optical communication unit 14B serving as an example of a second optical communication unit.

This enables data from a greater number of user satellites 3 to be transmitted to the ground station 4, while satisfying the limit value of the data rate between the communication relay satellite 2 and the ground station 4, when the communication relay satellite 2 relays communication between the plural user satellites 3A, 3B, 3C and the ground station 4.

As described above, the communication control device 16 of the communication control system 12 according to the first exemplary embodiment controls communication between the communication relay satellite and the plural user satellites such that, when the communication relay satellite relays communication between the plural satellites and the ground station, the sum of the data rates expressing the communication rates per unit time between the plural user satellites and the communication relay satellite is not greater than the limit value of the data rate between the communication relay satellite and the ground station. This enables data from a greater possible number of user satellites to be transmitted to the ground station, while satisfying the limit value of the data rate between the communication relay satellite and the ground station, when the communication relay satellite relays communication between the plural user satellites and the ground station.

Moreover, increasing the number of user satellites performing simultaneous communication enables the utilization rate of the communication line between the communication relay satellite and the ground station to be improved.

Satellite System of Second Exemplary Embodiment

Next, explanation follows regarding a second exemplary embodiment. Note that configuration of a satellite system and a communication control system of the second exemplary embodiment is similar to the configuration of the first exemplary embodiment, and so the same reference numerals are allocated and explanation thereof is omitted.

The communication control system of the second exemplary embodiment differs to the first exemplary embodiment in the respect that the communication relay satellite 2 computes $X_{aq}$ based on an acquisition timespan X expressing a timespan required for the communication relay satellite 2 to acquire a user satellite 3, and sets the communication timespan $T_{co}$ between a user satellite 3 and an optical communication unit 14 accordingly.

As is indicated by Equation (3), the communication timespan $T_{co}$ between a user satellite 3 and an optical communication unit 14 is computed based on the timespan $X_{aq}$ required to establish a communication line between the user satellite 3 and the optical communication unit 14.

The communication control system of the second exemplary embodiment computes the acquisition timespan X expressing the timespan required for an optical communication unit 14 to acquire a user satellite 3, this being included in the timespan $X_{aq}$ required to establish a communication line between a user satellite 3 and an optical communication unit 14. The communication control system of the second exemplary embodiment then sets the communication timespan $T_{co}$ in response to the timespan $X_{aq}$ including the acquisition timespan X.

Most of the time required when establishing a communication line between a user satellite 3 and an optical communication unit 14 is the acquisition timespan X during which the optical communication unit 14 acquires the user satellite 3. Thus, the communication control system of the second exemplary embodiment computes this acquisition timespan X, and sets the communication timespan $T_{co}$ in response to this acquisition timespan X.

Detailed Explanation Follows Below.

Note that in the second exemplary embodiment, explanation follows regarding an example of a case in which the communication relay satellite 2 is the satellite that emits a beacon laser signal, and a user satellite 3 is the satellite that receives the beacon laser signal. Thus, explanation follows regarding an example of a case in which the communication relay satellite 2 acquires this user satellite 3 that is to be its communication partner.

First, the setting section 160 of the communication control device 16 of the communication relay satellite 2 computes an uncertainty area where the user satellite 3 that is the communication target of an optical communication unit 14 might be present. Specifically, the setting section 160 computes an uncertainty area where the user satellite 3 might be present using a known method, based on a computed orbit of the user satellite 3, prediction error regarding the orbit of the user satellite 3, attitude determination accuracy information for the user satellite 3, attitude control accuracy, and so on. Note that a position where the user satellite 3 might be present is predicted based on the computed orbit of the user satellite 3, prediction error of the orbit of the user satellite 3, attitude determination accuracy for the user satellite 3, attitude control accuracy, and so on.

FIG. 11 to FIG. 13 are diagrams for explaining acquisition of the user satellite 3 by the communication relay satellite 2. As described below, acquisition of the user satellite 3 by the communication relay satellite 2 is configured of a step of satellite tracking, a step of coarse acquisition of the user satellite 3 by the communication relay satellite 2, a step of coarse acquisition of the communication relay satellite 2 by the user satellite 3, and a step of fine acquisition. Note that the acquisition method illustrated in FIG. 11 to FIG. 13 is a spiral scanning method. In the second exemplary embodiment, explanation follows regarding an example of a case in which this spiral scanning method configures the satellite acquisition method.

Satellite Tracking Step

First, the setting section 160 computes an uncertainty area F where the user satellite 3 might be present such as that illustrated in FIG. 11 using a known method based on a computed orbit result for the user satellite 3, prediction error of the orbit of the user satellite 3, attitude accuracy for the user satellite 3, attitude control accuracy, and so on.

Step of Coarse Acquisition of User Satellite 3 by Communication Relay Satellite 2

Next, the control section 162 controls so as to direct the optical telescope of the optical communication unit 14 in a direction toward the uncertainty area F set by the setting section 160, and controls such that beams of beacon laser signal $L_1$ are output from the optical communication unit 14. Note that a divergence angle of the beams of beacon laser signal $L_1$ is normally smaller than the uncertainty area F. Thus, the control section 162 of the communication control device 16 of the communication relay satellite 2 controls the optical communication unit 14 such that the beacon laser signal $L_1$ is scanned within the uncertainty area F, and is scanned over the entire range of the uncertainty area F.

Next, as illustrated in FIG. 12, a light receiving sensor (not illustrated in the drawings) installed to the user satellite 3 receives the beacon laser signal $L_1$. The light receiving sensor (not illustrated in the drawings) is realized by a sensor such as a known quadrant photodiode detector or a CCD. A control device (not illustrated in the drawings) of the user satellite 3 then identifies the direction of the communication relay satellite 2 from an output value of the light receiving sensor.

Step of Coarse Acquisition of Communication Relay Satellite 2 by User Satellite 3

Next, as illustrated in FIG. 13, the user satellite 3 emits an beacon laser signal $L_2$ in the direction of the identified communication relay satellite 2. The optical communication unit 14 of the communication relay satellite 2 receives the beacon laser signal $L_2$ output by the user satellite 3. Note that the light receiving sensor (not illustrated in the drawings) employed when this is performed may similarly be realized by a sensor such as a quadrant photodiode detector or a CCD. The control section 162 of the communication control device 16 of the communication relay satellite 2 identifies the direction of the user satellite 3 from the output value of the light receiving sensor.

Fine Acquisition Step

Next, the control section 162 of the communication control device 16 of the communication relay satellite 2 controls so as to stop emission of the beacon laser signal $L_1$ from the optical communication unit 14. As illustrated in FIG. 13, the control section 162 of the communication control device 16 then emits a beacon laser signal $L_3$ in the direction of the identified user satellite 3. The user satellite 3 receives the beacon laser signal $L_3$. Acquisition of the user satellite 3 by the communication relay satellite 2 is thereby complete.

The communication relay satellite 2 and the user satellite 3 then employ known technology to suppress external disturbance that might affect vibration of the satellites themselves and the optical communication line between the satellites by adjusting pointing mechanisms (not illustrated in the drawings) such as coarse pointing mechanism and fine pointing (mechanism or mirror) in order to realize stable tracking.

Next, explanation follows regarding an example of a method of computing the acquisition timespan X when the spiral scanning method is employed.

As illustrated in FIG. 11, in the spiral scanning method, the beacon laser signal $L_1$ is scanned in a spiral shape inside the uncertainty area F. Polar coordinates employed for acquisition by spiral scanning are expressed by Equation (5) below. Note that in Equation (5) below, ρ corresponds to a distance r from the origin in polar coordinates. Moreover, in Equation (5) below, θ corresponds to an angle in polar coordinates.

[Math. 5]

$$\rho = \frac{I_\theta}{2\pi}\theta \qquad (5)$$

A view of the signal light $L_1$ in FIG. 11 as viewed from a direction M is illustrated in FIG. 14. As illustrated in FIG. 14, $I_0$ in Equation (5) indicates a distance between the beacon laser signal emitted at a first timing indicating a given timing and the beacon laser signal emitted at a second timing indicating the next timing thereafter.

In order for the trajectory of the beams of beacon laser signal to cover the entire uncertainty area F, the following Equation (6) needs to be satisfied. Note that $\theta_b$ in the following equation indicates the divergence angle of the beams of beacon laser signal.

[Math. 6]

$$I_\theta = \sqrt{2\theta_b} \qquad (6)$$

As illustrated in FIG. 11, in cases in which the size of the uncertainty area F is $\theta_\mu$ (note that $\theta_\mu$ is also a view angle $\theta_\mu$ of a spiral formed by a time series of the beacon laser signal), when a time interval expressing an interval between scanning of two adjacent beams of beacon laser signal is assumed to be Δt, a timespan $t_\mu$ required to complete scanning of the entire uncertainty area F is expressed by Equation (7) below.

[Math. 7]

$$t_\mu = \frac{\pi \theta_\mu^2}{I_\theta^2} \Delta t \qquad (7)$$

An example of a method for setting the time interval Δt is given in Equation (8). Note that L expresses a communication distance between the communication relay satellite 2 and the user satellite 3, c expresses light speed, $t_g$ expresses a response time of the light receiving sensor included in the communication relay satellite 2, and F expresses a bandwidth of a steering mirror for scanning signal light. The communication distance L between the communication relay satellite 2 and the user satellite 3 is derived by computing the uncertainty area F.

[Math. 8]

$$\Delta t = \frac{2L}{c} + \frac{1}{F} + 2t_S \qquad (8)$$

Note that computation Equations (5) to (8) of the spiral scanning method are described in the following Cited Reference Document.

Cited Reference Document

"Beaconless acquisition tracking and pointing scheme of satellite optical communication in multi-layer satellite networks" by Weiqi Chen, Qi Zhang, Xiangjun Xin, Qinghua Tian, Ying Tao, Yufei Shen, Guixing Cao, RUi Ding, and Yifan Zhang in Proceedings SPIE 11023, Fifth Symposium on Novel Optoelectronic Detection Technology and Application, 110231E (Mar. 12, 2019); https://doi.org/10.1117/12.2521600.

In this manner, the setting section 160 of the second exemplary embodiment computes a first timespan required for the beacon laser signal $L_1$, this being an example of a first beacon laser signal output from the communication relay satellite 2, to be received by the user satellite 3.

The setting section 160 of the second exemplary embodiment also computes a second timespan required for the beacon laser signal $L_2$ output by the user satellite 3 in response to the beacon laser signal $L_1$ being received by the user satellite 3 to be received by the communication relay satellite 2.

The setting section 160 of the second exemplary embodiment also computes a third timespan required for the beacon laser signal $L_3$ output by the communication relay satellite 2 in response to the beacon laser signal $L_2$ being received by the communication relay satellite 2 to be received by the user satellite 3.

The setting section 160 of the second exemplary embodiment then computes the acquisition timespan X as a sum of the first timespan, the second timespan, and the third timespan.

Note that in the second exemplary embodiment, the first timespan corresponds to the scanning timespan t, derived in Equation (7).

Thus, the setting section 160 of the second exemplary embodiment first computes the time interval Δt according to Equation (8) based on the light speed c, the communication distance L between the communication relay satellite 2 and the user satellite 3, the bandwidth F of the steering mirror for scanning beacon laser signal, and the response time $t_g$ of the light receiving sensor included in the communication relay satellite 2.

Next, the setting section 160 of the second exemplary embodiment computes the scanning timespan $t_\mu$, this being an example of the first timespan, according to Equation (7), based on the computed time interval Δt, the view angle $\theta_\mu$ of the spiral formed by a time series of the emitted beacon laser signal, and the distance $I_0$ between the beacon laser signal emitted at the first timing and the beacon laser signal emitted at the second timing.

The setting section 160 of the second exemplary embodiment also computes the second timespan and the third timespan based on the position where the user satellite 3 might be present and so on. Note that information regarding the position where the user satellite 3 might be present at a given timing and so on may be transmitted in advance to the communication relay satellite 2 by the ground station 4 or the like.

The setting section 160 of the second exemplary embodiment sets the acquisition timespan X, expressing a sum of the computed scanning timespan $t_\mu$ that is an example of the first timespan, the second timespan, and the third timespan, as the timespan $X_{aq}$ required for the optical communication unit 14 to establish a communication line with the user satellite 3. Note that the setting section 160 may set the timespan $X_{aq}$ by further adding a predetermined timespan to the sum of the scanning timespan the second timespan, and the third timespan.

Operation of Communication Control System 12

Next, explanation follows regarding operation of the communication control system 12 of the second exemplary embodiment. The communication control device 16 executes the acquisition timespan setting processing routine illustrated in FIG. 15 when the communication control system 12 is actuated and receives an instruction signal instructing the start of optical communication between the plural user satellites 3A, 3B, 3C and the communication relay satellite 2.

At step S200, the setting section 160 identifies the uncertainty area F where the user satellite 3 that is the communication target of the optical communication unit 14 might be present.

At step S202, the setting section 160 computes the time interval Δt expressing a time interval between emissions of beacon laser signal when scanning beacon laser signal inside the uncertainty area F using the spiral scanning method for acquiring the user satellite 3. Specifically, the setting section 160 computes the time interval Δt according to Equation (8) based on the light speed c, the communication distance L between the communication relay satellite 2 and the user satellite 3, the bandwidth F of the steering mirror for scanning beacon laser signal, and the response time $t_s$ of the light receiving sensor included in the communication relay satellite 2.

At step S204, the setting section 160 computes the scanning timespan $t_\mu$ according to Equation (7) based on the time interval Δt computed at step S202, the view angle $\theta_\mu$ of the spiral formed by a time series of the emitted beacon laser signal, and the distance $I_0$ between the beacon laser signal emitted at the first timing and the beacon laser signal emitted at the second timing.

At step S205, the setting section 160 computes the second timespan and the third timespan based on the position where the user satellite 3 might be present and so on.

At step S206, the setting section 160 sets a sum of the computed scanning timespan t, computed at step S204 and the second timespan and third timespan set at step S205 as the timespan $X_{aq}$ required for the optical communication unit 14 to establish a communication line with the user satellite 3.

On finishing execution of the acquisition timespan setting processing routine illustrated in FIG. 15, the communication control device 16 executes the communication control processing routine illustrated in FIG. 10. When the communication timespan $T_{co}$ is computed according to Equation (3) during this processing, the communication timespan $T_{co}$ is computed using the timespan $X_{aq}$ set by the setting section 160 of the second exemplary embodiment. The communication timespan $T_{co}$ is thereby set in response to the time required to acquire the user satellite 3.

Since other configuration and operation of the satellite system and the communication control system of the second exemplary embodiment are similar to those of the first exemplary embodiment, explanation thereof is omitted.

As described above, the communication control device 16 of the communication control system 12 according to the second exemplary embodiment computes the first timespan required for the beacon laser signal $L_1$, this being an example of a first beacon laser signal output by the communication relay satellite 2, to be received by the user satellite 3. The communication control device 16 also computes the second timespan required for the beacon laser signal $L_2$ output by the user satellite 3 in response to the beacon laser signal $L_1$ being received by the user satellite 3 to be received by the communication relay satellite 2. The communication control device 16 also computes the third timespan required for the beacon laser signal $L_3$ output by the communication relay satellite 2 in response to the beacon laser signal $L_2$ being received by the communication relay satellite 2 to be received by the user satellite 3. The communication control device 16 computes the acquisition timespan X as a sum of the first timespan, the second timespan, and the third timespan. The communication control device 16 then sets the acquisition timespan X as the timespan $X_{aq}$ required for the optical communication unit 14 to establish a communication line with the user satellite 3. This enables the communication timespan $T_{co}$ to be set in response to the time required to acquire the user satellite 3.

Note that the communication control device 16 identifies a uncertainty area where the user satellite 3, this being the communication target of the optical communication unit, might be present. The communication control device 16 also computes the scanning timespan $t_\mu$ expressing the time required to scan the beacon laser signal for acquiring the user satellite, based on the computed time interval $\Delta t$ expressing a time interval between emissions of beacon laser signal, the view angle $\theta_\mu$ of the spiral formed by a time series of the emitted beacon laser signal, and the distance $I_0$ between the beacon laser signal emitted at the first timing and the beacon laser signal emitted at the second timing, for when scanning the beacon laser signal inside the uncertainty area using the spiral scanning method for acquiring the user satellite. The communication control device 16 then adopts the scanning timespan $t_\mu$ as the first timespan required for the beacon laser signal $L_1$, this being an example of a first beacon laser signal output by the communication relay satellite 2, to be received by the user satellite 3. This enables the timespan $X_{aq}$ required to add the user satellite 3 using the spiral scanning method to be computed.

The size of the uncertainty area F is a range where the user satellite 3 might be present at a given point in time, and is decided in consideration of prediction accuracy of the orbit of the user satellite 3 to perform optical communication, attitude control accuracy, characteristics of the optical communication unit, and so on. The actual accuracy of the uncertainty area F depends on the overall system, and so differs according to the user satellite 3. Thus, taking poor accuracy, error, and so on into consideration, the uncertainty area F may be set as a large region at an initial point of actual operation. Then, as operation progresses, the characteristics of the optical communication unit 14 and accuracy in acquiring a user satellite 3 may be expected to improve, and so the size of the uncertainty area F may be reduced.

Alternatively, the communication relay satellite 2 may successively record the acquisition timespan X for a user satellite 3 performing optical communication, such that when planning the next communication, the communication relay satellite 2 may reduce the predicted acquisition timespan X by updating the uncertainty area F where the user satellite 3 might be present, taking a difference between the position where the user satellite 3 was present and acquired in the past and the predicted position of the user satellite 3 into consideration. In such cases, the number of communications with the user satellite 3 per unit time may be increased.

Note that the present disclosure is not limited to the exemplary embodiments described above, and various modifications may be applied within a range not departing from the spirit of the present invention.

For example, in the above exemplary embodiments, examples have been described in which the communication control device 16 controls the plural optical communication units 14A, 14B, 14C such that, while an optical communication unit 14 is receiving data from a user satellite 3 that is the optical communication target, the received data is transmitted in parallel from the communication relay satellite 2 to the ground station 4. However, there is no limitation thereto. For example, the communication control device 16 may temporarily store the data received from the user satellite 3 in a storage section. For example, the communication control device 16 may temporarily store data received from plural user satellites 3 in the storage section in cases in which a total rate of the data rates received from the plural user satellites 3 exceeds the data rate limit value of the communication line between the communication relay satellite 2 and the ground station 4. Alternatively, for example, in cases in which Equation (1) is not satisfied, the communication control device 16 may temporarily store data received from the user satellites 3 in the storage section. The communication control device 16 may then transmit the data stored in the storage section to the ground station 4 when there is spare capacity in the communication line between the communication relay satellite 2 and the ground station 4.

Moreover, in the above exemplary embodiments, examples have been described in which the data rate limit value of communication lines between the user satellites 3 and the optical communication units 14 is a uniform $R_U$. However, there is no limitation thereto. For example, the data rate limit value $R_U$ may be a different value for each optical communication unit 14.

Note that although examples in which there is only one high frequency wireless communication unit, this being an example of a relay communication unit, have been described in the above exemplary embodiments, there is no limitation thereto. Plural high frequency wireless communication units that are examples of relay communication units may be provided. Furthermore, the relay communication unit may be an optical communication unit as described previously.

Moreover, in the above exemplary embodiments, examples have been described in which the setting section 160 of the communication control device 16 sets various data and so on, and the control section 162 performs various control to execute a control sequence of communication by the optical communication units 14 based on the data set by the setting section 160. However, there is no limitation thereto. For example, control sequence information for the optical communication units 14 and the relay communication unit decided by the ground-based server 6 may be transmitted in advance to the communication relay satellite 2 and operators of the user satellites 3 via the ground station 4 or the server 6 connected to the ground station 4. The communication control device 16 of the communication relay satellite 2 may then execute the various settings and control in FIG. 10 or FIG. 15 based on received control sequence information. In such cases, the control sequence information may be decided based on scheduling information that specifies timings of optical communication between the communication relay satellite 2 and the user satellites 3 and is computed by an operator of the communication relay satellite 2 based on information obtained from operators of the user satellites 3 such as position information of the user satellites 3.

Moreover, in the above exemplary embodiments, examples have been described in which the communication timespan $T_{co}$ is computed according to Equation (3), and the plural optical communication units 14A, 14B, 14C are controlled according to the communication timespan $T_{co}$. However, there is no limitation thereto. For example, a predetermined timespan $T_{ur}$ may be added to the communication timespan $T_{co}$ in response to a user request. In such cases, for example, as illustrated in FIG. 16, the timespan $T_{ur}$ may be added to the communication timespan $T_{co}$ of the optical communication unit 14A in response to a user request so as to be offset from communication by the optical communication unit 14B and the optical communication unit 14C by the timespan $T_{ur}$.

Although an example in which the spiral scanning method is employed as a method to acquire a satellite has been described in the second exemplary embodiment, there is no limitation thereto. Another method may be employed as the method to acquire a satellite. Note that in such cases, by computing at least the first timespan and the second timespan out of the respective timespans computed in the second exemplary embodiment, the acquisition timespan X expressing the time required for the communication relay satellite 2 (or an optical communication unit 14) to acquire a user satellite 3 can be computed.

Thus, for example, the communication control device 16 may compute the acquisition timespan X in response to the first timespan required for the first beacon laser signal $L_1$ output by the communication relay satellite 2 to be received by the user satellite 3, and the second timespan required for the second beacon laser signal $L_2$ output by the user satellite 3 in response to the first beacon laser signal $L_1$ being received by the user satellite 3 to be received by the communication relay satellite 2. For example, the communication control device 16 may compute the acquisition timespan X as a sum of the first timespan and the second timespan.

Alternatively, for example, the communication control device 16 may compute the acquisition timespan X in response to the first timespan required for the first beacon laser signal $L_1$ output by the user satellite 3 to be received by the communication relay satellite 2, and the second timespan required for the second beacon laser signal $L_2$ output by the communication relay satellite 2 in response to the first beacon laser signal $L_1$ being received by the communication relay satellite 2 to be received by the user satellite 3. For example, the communication control device 16 may compute the acquisition timespan X as a sum of the first timespan and the second timespan.

Although examples in which the plural satellites are user satellites have been described in the above exemplary embodiments, there is no limitation thereto. For example, at least one satellite out of the plural satellites may be another communication relay satellite.

Although examples in which the communication relay satellite 2 relays communication between the plural user satellites 3 and the ground station 4 have been described in the above exemplary embodiments, there is no limitation thereto. Another Earth station that performs wireless communication with the communication relay satellite (such as a wireless station established on the ground or in the Earth's atmosphere that may be mobile) may be employed instead of the ground station 4. In such cases, the communication relay satellite 2 relays communication between the plural user satellites 3 and the Earth station. For example, employing an Earth station established in the stratosphere has merits such that a timespan for optical communication from the communication relay satellite 2 to the Earth station can be stably secured without being affected by the communication environment on the ground, such as the weather. Alternatively, another user satellite or another communication relay satellite may be employed instead of the ground station 4. In such cases, the communication relay satellite 2 relays communication between the plural user satellites 3 and the other user satellite or the other communication relay satellite. Note that this communication may be by optical communication, in which case the relay communication unit is an optical communication unit.

In the present specification, exemplary embodiments have been described in which a program is pre-installed in the storage section 73 of the computer 70. However, this program may be provided stored in a computer-readable recording medium. For example, the program may be provided in a format stored on a non-transitory storage medium such as compact disc read only memory (CD-ROM), digital versatile disc read only memory (DVD-ROM), or universal serial bus (USB) memory. Alternatively, the program may be provided in a format downloadable from an external device over a network.

Note that the various processing executed by the CPU reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Alternatively, a general-purpose graphics processing unit (GPGPU) may be employed as a processor. The respective processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, the respective processing of the exemplary embodiments may be configured by a computer, a server, or the like including a general computation processing device, a storage device, and the like executing by a program. Such a program may be stored in a storage device, recorded on a recording medium such as a magnetic disc, an optical disc, or semiconductor memory, or provided over a network. Obviously, the various other configuration elements do not necessarily have to be realized by a single computer or server, and may be shared between and realized by plural separate computers connected together over a network.

All cited documents, patent applications, and technical standards mentioned in the present specification are incorporated by reference in the present specification to the same extent as if each individual cited document, patent application, or technical standard was specifically and individually indicated to be incorporated by reference.

Note that in the above exemplary embodiments, cases in which "only", such as "based on only . . . ", "in response to only . . . ", and "in cases in which only . . . ", is not employed envisage that additional information may also be taken into consideration in the present specification. As an example, in addition to the described cases, "in cases in which A occurs, B is performed" does not necessarily mean that B is always performed when A occurs.

In any method, program, terminal, device, server, or system (hereafter "method, etc."), even in there is an aspect of an operation different to operation described in the present specification is performed, the respective aspects of technology disclosed herein are applicable to any operations the same as operations described in the present specification, and the presence of the operation different to the operation described in the present specification does not mean that the method, etc. is outside the range of the respective aspects of the technology disclosed herein.

Supplements are disclosed below.

Supplement 1

A communication control apparatus including:
a control section configured to control communication between a communication relay satellite and plural satellites such that, when the communication relay satellite relays communication between the plural satellites and other equipment, a sum of data rates expressing communication rates per unit time between the plural satellites and the communication relay satellite is not greater than a limit value of a data rate between the communication relay satellite and the other equipment.

Supplement 2

The communication control apparatus of supplement 1, wherein:
the communication relay satellite includes plural optical communication units to perform optical communication with the plural satellites, and an equipment communication unit to perform communication with the other equipment; and
the control section controls communication between the plural optical communication units and the plural satellites such that a sum of data rates between the plural satellites and the plural optical communication units is not greater than a limit value of a data rate between the equipment communication unit and the other equipment.

Supplement 3

The communication control apparatus of supplement 2, further including:
a setting section configured to set a number $N_{op}$ of the optical communication units to perform simultaneous optical communication out of the plural optical communication units according to Equation (1) below based on a limit value $R_U$ of the data rate of a communication line between one of the satellites and one of the optical communication units and on a limit value $R_G$ of the data rate of a communication line between the equipment communication unit and the other equipment,
the control section being configured to control the $N_{op}$ optical communication units such that communication is performed between the $N_{op}$ optical communication units and the plural satellites.

[Math. 9]

$$N_{op} = \left[\frac{R_G}{R_U}\right] \tag{1}$$

Supplement 4

The communication control apparatus of supplement 3, wherein:
the setting section is further configured to
in cases in which the number $N_{op}$ of the optical communication units is less than a total number $N_U$ of the optical communication units, set a communication timespan $T_{co}$ expressing a timespan to perform communication between one of the satellites and one of the optical communication units according to Equation (2) based on the number $N_{op}$ of the optical communication units, a timespan $X_{aq}$ required to establish a communication line between the one satellite and the one optical communication unit, and the total number $N_U$ of the optical communication units,
set a control timespan $T_{dif}$ to control communication start timings according to Equation (3) below based on the communication timespan $T_{co}$ and the number $N_{op}$ of the optical communication units; and
the control section is configured to
control based on the communication timespan $T_{co}$ and the control timespan $T_{dif}$ such that a data communication timespan between a first satellite out of the plural satellites and a first optical communication unit out of the plural optical communication units is the communication timespan $T_{co}$, and
control such that data communication is started between a second satellite out of the plural satellites and a second optical communication unit out of the plural optical communication units when the control timespan $T_{dif}$ has elapsed since communication started between the first satellite and the first optical communication unit.

[Math. 10]

$$T_{co} = \frac{X_{aq}}{N_U - N_{op}} \times N_{op} \tag{2}$$

[Math. 11]

$$T_{dif} = \frac{T_{co}}{N_{op}} \tag{3}$$

Supplement 5

The communication control apparatus of supplement 4, wherein:
an acquisition timespan X expressing a timespan required for one of the optical communication units to acquire one of the satellites is included in the timespan $X_{aq}$ required to establish a communication line between the one satellite and the one optical communication unit; and the setting section is configured to set the communication timespan $T_{co}$ in response to the timespan $X_{aq}$ including the acquisition timespan X.

Supplement 6

The communication control apparatus of supplement 5, wherein the setting section is configured to:
compute the acquisition timespan X in response to a first timespan required for a first beacon laser signal output from the communication relay satellite to be received by one of the satellites, and a second timespan required for a second beacon laser signal output by the one satellite in response to the first beacon laser signal being received by the one satellite to be received by the communication relay satellite; and
set the communication timespan $T_{co}$ in response to the timespan $X_{aq}$ including the acquisition timespan X.

Supplement 7

The communication control apparatus of supplement 5, wherein the setting section is configured to:
compute the acquisition timespan X in response to a first timespan required for a first beacon laser signal output from one of the satellites to be received by the communication relay satellite, and a second timespan required for a second beacon laser signal output by the communication relay satellite in response to the first beacon laser signal being received by the communication relay satellite to be received by the one satellite; and
set the communication timespan $T_{co}$ in response to the timespan $X_{aq}$ including the acquisition timespan X.

Supplement 8

The communication control apparatus of any one of supplements 1 to 7, wherein at least one satellite out of the plural satellites is another communication relay satellite.

Supplement 9

The communication control apparatus of any one of supplements 2 to 8, wherein the other equipment is at least one of an Earth station or a ground station configured to perform wireless communication with the communication relay satellite.

Supplement 10

The communication control apparatus of any one of supplements 2 to 8, wherein:
the equipment communication unit configured to perform communication with the other equipment is an optical communication unit; and
the other equipment is at least one of an Earth station, a ground station, a satellite, or another communication relay satellite configured to perform optical communication with the communication relay satellite.

Supplement 11

A communication control method including respective processing executed by the communication control apparatus of any one of supplements 1 to 10.

Supplement 12

A communication control program for causing a computer to function as respective sections of the communication control apparatus of any one of supplements 1 to 10.

Supplement 13

A communication control system including:
plural optical communication units configured to perform optical communication with plural satellites;
a ground communication unit configured to communicate with a ground station; and
the communication control apparatus of any one of supplements 1 to 10.

Supplement 14

A communication relay satellite installed with the communication control system of supplement 13.

Supplement 15

A satellite system including:
plural satellites;
a communication relay satellite;
a ground station; and
the communication control apparatus of any one of supplements 1 to 10.

REFERENCE SIGNS LIST 1 satellite system
2 communication relay satellite
3A, 3B, 3C user satellite
4 ground station
12 communication control system
14a, 14b, 14c optical communication unit
16 communication control device
18 signal switching circuit
20 high frequency wireless communication unit
70 computer

The invention claimed is:

1. A communication control apparatus configured to relay communication between a plurality of satellites and other equipment, the communication control apparatus comprising:
a plurality of optical communication units that are capable of performing optical communication in parallel with the plurality of satellites;
an equipment communication unit configured to communicate with the other equipment; and
a processor that is configured to:
set a first data rate that is a sum of data communication rates per unit time between the plurality of satellites and the plurality of optical communication units, and to set a second data rate that is a limit value of a data communication rate per unit time between the communication control apparatus and the other equipment;
control the plurality of optical communication units and the equipment communication unit such that data received by the plurality of optical communication units from the plurality of satellites at the first data rate is relay transferred in parallel to the other equipment at not greater than the second data rate;
set a maximum number $N_{op}$ of the optical communication units able to perform optical communication in parallel with the plurality of satellites,
wherein the maximum number $N_{op}$ being a greatest integer that does not exceed a quotient obtained by dividing a limit value $R_G$ of the second data rate by a limit value $R_U$ of a data rate between one of the satellites and one of the optical communication units,
the limit value $R_G$ being not less than the limit value $R_U$; and
control the optical communication units such that $N_{op}$ of the optical communication units are employed at a maximum to perform optical communication in parallel with the plurality of satellites.

2. The communication control apparatus of claim 1, wherein:
the communication control apparatus is a communication relay satellite;
communication between the other equipment and the equipment communication unit is either radio communication or optical communication; and the other equipment is at least one of a ground station, an Earth station, or another communication relay satellite.

3. The communication control apparatus of claim 1, wherein:
the plurality of satellites are satellites orbiting in a first orbit;
the communication control apparatus is a communication relay satellite orbiting in a second orbit;
communication between the other equipment and the equipment communication unit is either radio communication or optical communication;
the second orbit is at a higher altitude from the Earth's surface than the first orbit and at a lower altitude from the Earth's surface than a geosynchronous orbit; and
the other equipment is at least one of a ground station, an Earth station, or another communication relay satellite.

4. The communication control apparatus of claim 1, wherein the processor is configured to:
receive control sequence information for controlling the plurality of optical communication units and the equipment communication unit from the other equipment; and
set the first data rate and the second data rate.

5. The communication control apparatus of claim 1, wherein:
the $N_{op}$ is computed according to Equation (1) below using the limit value $R_U$ and the limit value $R_G$; and
the processor is configured to control the optical communication units such that $N_{op}$ of the optical communication units at a maximum perform optical communication in parallel with the plurality of satellites;

[Math. 1]

$$N_{op} = \left[\frac{R_G}{R_U}\right]. \tag{1}$$

6. The communication control apparatus of claim 5, wherein
the processor is further configured to:
set a communication timespan $T_{co}$ expressing a timespan for performing data communication between each of the plurality of satellites and one of the plurality of optical communication units, and a control timespan $T_{dif}$ to control start timings of data communication by the plurality of optical communication units;
in a case in which the $N_{op}$ is less than a total number $N_u$ of the plurality of optical communication units, set the communication timespan $T_{co}$ according to Equation (2) below using the number $N_{op}$ of the optical communication units, a timespan $X_{aq}$ required to establish a communication line between one of the satellites and one of the optical communication units, and the total number $N_u$ of optical communication units;
set the control timespan $T_{dif}$ according to Equation (3) below using the communication timespan $T_{co}$ and the number $N_{op}$ of the optical communication units;
control based on the communication timespan $T_{co}$ and the control timespan $T_{dif}$ such that a data communication timespan between a first satellite of the plurality of satellites and a first optical communication unit of the plurality of optical communication units is not greater than the communication timespan $T_{co}$; and
control such that data communication is started between a second satellite of the plurality of satellites and a second optical communication unit of the plurality of optical communication units when the control timespan $T_{dif}$ has elapsed since the data communication started between the first satellite and the first optical communication unit;

[Math. 2]

$$T_{co} = \frac{X_{aq}}{N_U - N_{op}} \times N_{op} \tag{2}$$

[Math. 3]

$$T_{dif} = \frac{T_{co}}{N_{op}}. \tag{3}$$

7. The communication control apparatus of claim 6, wherein:
an acquisition timespan X representing a timespan required for one of the optical communication units to acquire one of the satellites is included in the timespan $X_{aq}$ required to establish a communication line between the one satellite and the one optical communication unit; and
the processor is configured to set the communication timespan $T_{co}$ in response to the timespan $X_{aq}$ including the acquisition timespan X.

8. The communication control apparatus of claim 7, wherein:
the acquisition timespan X is computed in response to a first timespan required for a first beacon laser signal output from one of the optical communication units to be received by one of the satellites, and a second timespan required for a second beacon laser signal output by the one satellite in response to the first beacon laser signal being received by the one satellite to be received by the one optical communication unit; and
the processor is configured to set the communication timespan $T_{co}$ in response to the timespan $X_{aq}$ including the acquisition timespan X.

9. The communication control apparatus of claim 7, wherein:
the acquisition timespan X is computed in response to a first timespan required for a first beacon laser signal output from one of the satellites to be received by one of the optical communication units, and a second timespan required for a second beacon laser signal output by the one optical communication unit in response to the first beacon laser signal being received by the one optical communication unit to be received by the one satellite; and
the processor is configured to set the communication timespan $T_{co}$ in response to the timespan $X_{aq}$ including the acquisition timespan X.

10. A communication control method executed by a communication control apparatus configured to relay communication between a plurality of satellites and other equipment, the communication control method comprising:
setting a first data rate that is a sum of data communication rates per unit time between the plurality of satellites and a plurality of optical communication units;
setting a second data rate that is a limit value of a data communication rate per unit time between the other equipment and an equipment communication unit;
controlling the plurality of optical communication units and the equipment communication unit such that data received by the plurality of optical communication units from the plurality of satellites at the first data rate is relay transferred in parallel to the other equipment at not greater than the second data rate in a case in which the plurality of satellites and the plurality of optical communication units perform optical communication in parallel; and when controlling the plurality of optical communication units and the equipment communication unit:

setting a maximum number $N_{op}$ of the optical communication units able to perform optical communication in parallel with the plurality of satellites, the maximum number $N_{op}$ being a greatest integer that does not exceed a quotient obtained by dividing a limit value $R_G$ of the second data rate by a limit value $R_U$ of a data rate between one of the satellites and one of the optical communication units, the limit value $R_G$ being not less than the limit value $R_U$, and the optical communication units being controlled such that $N_{op}$ of the optical communication units are employed at a maximum to perform parallel optical communication in parallel with the plurality of satellites.

11. The communication control method of claim 10, wherein:

the plurality of satellites are satellites orbiting in a first orbit;

the communication control apparatus is a communication relay satellite orbiting in a second orbit;

communication between the other equipment and the equipment communication unit is either radio communication or optical communication;

the second orbit is at a higher altitude from the Earth's surface than the first orbit and at a lower altitude from the Earth's surface than a geosynchronous orbit; and the other equipment is at least one of a ground station, an Earth station, or another communication relay satellite.

12. The communication control method of claim 10, wherein:

the first data rate and the second data rate are set based on control sequence information that is transmitted to the communication control apparatus by the other equipment for controlling the plurality of optical communication units and the equipment communication unit.

13. A non-transitory computer-readable medium storing a communication relay program including instructions that, when executed by a processor, causes a communication control apparatus configured to relay communication between a plurality of satellites and other equipment to:

set a first data rate that is a sum of data communication rates per unit time between the plurality of satellites and a plurality of optical communication units;

set a second data rate that is a limit value of a data communication rate per unit time between the other equipment and an equipment communication unit;

control the plurality of optical communication units and the equipment communication unit such that data received by the plurality of optical communication units from the plurality of satellites at the first data rate is relay transferred in parallel to the other equipment at not greater than the second data rate in a case in which the plurality of satellites and the plurality of optical communication units perform optical communication in parallel; and when controlling the plurality of optical communication units and the equipment communication unit:

setting a maximum number $N_{op}$ of optical communication units able to perform optical communication in parallel with the plurality of satellites, the maximum number $N_{op}$ being a greatest integer that does not exceed a quotient obtained by dividing a limit value $R_G$ of the second data rate by a limit value $R_U$ of a data rate between one of the satellites and one of the optical communication units, the limit value $R_G$ being not less than the limit value $R_U$, and the optical communication units being controlled such that $N_{op}$ of the optical communication units are employed at a maximum to perform optical communication in parallel with the plurality of satellites.

14. The non-transitory computer-readable medium of claim 13, wherein:

the plurality of satellites are satellites orbiting in a first orbit;

the communication control apparatus is a communication relay satellite orbiting in a second orbit;

communication between the other equipment and the equipment communication unit is either radio communication or optical communication;

the second orbit is at a higher altitude from the Earth's surface than the first orbit and at a lower altitude from the Earth's surface than a geosynchronous orbit; and the other equipment is at least one of a ground station, an Earth station, or another communication relay satellite.

15. The non-transitory computer-readable medium of claim 13, wherein:

the first data rate and the second data rate are set based on control sequence information that is transmitted to the communication control apparatus by the other equipment for controlling the plurality of optical communication units and the equipment communication unit.

16. A communication control system including a communication control apparatus configured to relay communication between a plurality of satellites and other equipment, the communication control apparatus comprising:

a plurality of optical communication units that are capable of performing parallel optical communication with the plurality of satellites;

an equipment communication unit configured to communicate with the other equipment; and a processor that is configured:

to set a first data rate that is a sum of data communication rates per unit time between the plurality of satellites and the plurality of optical communication units; and to set a second data rate that is a limit value of a data communication rate per unit time between the equipment communication unit and the other equipment; and receive control sequence information in advance, via the other equipment, for controlling the plurality of optical communication units and the equipment communication unit such that, in a case in which the plurality of satellites and the plurality of optical communication units perform optical communication in parallel, data received by the plurality of optical communication units from the plurality of satellites at the first data rate is relay transferred in parallel to the other equipment at not greater than the second data rate, wherein the control sequence information including information for setting a maximum number $N_{op}$ of the optical communication units able to perform optical communication in parallel with the plurality of satellites, the maximum number $N_{op}$ being a greatest integer that does not exceed a quotient obtained by dividing a limit value $R_G$ of the second data rate by a limit value $R_U$ of a data rate between one of the satellites and one of the optical communication units, the limit value $R_G$ being not less than the limit value $R_U$, and the control sequence information being information for controlling the optical communication units such that $N_{op}$ of the optical communication units are employed at a maximum to perform optical communication in parallel with the plurality of satellites.

17. The communication control system of claim 16, wherein:

the plurality of satellites are satellites orbiting in a first orbit;

the communication control apparatus is a communication relay satellite orbiting in a second orbit;

communication between the other equipment and the equipment communication unit is either radio communication or optical communication;

the second orbit is at a higher altitude from the Earth's surface than the first orbit and at a lower altitude from the Earth's surface than a geosynchronous orbit; and the other equipment is at least one of a ground station, an Earth station, or another communication relay satellite.

* * * * *